United States Patent
DeHon et al.

(10) Patent No.: US 6,684,318 B2
(45) Date of Patent: Jan. 27, 2004

(54) INTERMEDIATE-GRAIN RECONFIGURABLE PROCESSING DEVICE

(75) Inventors: André DeHon, Cambridge, MA (US); Ethan Mirsky, Cambridge, MA (US); Thomas F. Knight, Jr., Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/293,887

(22) Filed: Nov. 12, 2002

(65) Prior Publication Data

US 2003/0200418 A1 Oct. 23, 2003

Related U.S. Application Data

(63) Continuation of application No. 09/892,812, filed on Jun. 27, 2001, now Pat. No. 6,496,918, which is a continuation of application No. 09/292,497, filed on Apr. 15, 1999, now Pat. No. 6,266,760, which is a continuation of application No. 08/632,371, filed on Apr. 11, 1996, now Pat. No. 5,956,518.

(51) Int. Cl.[7] ............................................ G06F 15/177
(52) U.S. Cl. ........................................ 712/15; 712/20
(58) Field of Search ........................... 712/15, 20, 33, 712/229

(56) References Cited

U.S. PATENT DOCUMENTS

| | | | |
|---|---|---|---|
| 4,597,041 A | 6/1986 | Guyer et al. | 364/200 |
| 4,722,084 A | 1/1988 | Morton | 371/9 |
| 4,748,585 A | 5/1988 | Chiarulli et al. | 364/900 |
| 4,754,412 A | 6/1988 | Deering | 364/736 |

(List continued on next page.)

OTHER PUBLICATIONS

T. Bridges, "The GPA Machine: A Generally Partitionable MSIMD Architecture," *Third Symposium on the Frontier of Massively Parallel Computation Proceedings IEEE* pp. 196–203 (1990).

P. Clarke, "Pilington Preps Reconfigurable Video DSP," *NEWS* (Aug. 7, 1995).

D.C. Chen, et al., "A Reconfigurable Multiprocess IC for Rapid Prototyping of Algorithmic–Specific High–Speed DSP Data Paths," *IEEE Journal of Solid–State Circuits, vol. 27* (12):1895–1904 (Dec. 1992).

A.K. Yueng, et al. "TA 6:3: A 2.4GOPS Data–Given Reconfigurable Multiprocessor IC for DSP," *IEEE International Solid–State Circuits Conference,* pps. 108–109, 346 (1995).

J.E. Brewer, et al., "Monolithic Processing Subsystem," *IEEE Transactions on Components, Packaging, and Manufacturing Technology—Part B, vol. 17*(3):310–317 (Aug. 1994).

I. Gilbert, Chapter 11—Mesh Multiprocessing, *The Lincoln Laboratory Journal, 1*(1):11.1–11.18 (Spring 1988).

(List continued on next page.)

*Primary Examiner*—Eric Coleman
(74) *Attorney, Agent, or Firm*—Hamilton, Brook, Smith & Reynolds, P.C.

(57) ABSTRACT

A programmable integrated circuit utilizes a large number of intermediate-grain processing elements which are multibit processing units arranged in a configurable mesh. The coarse-grain resources, such as memory and processing, are deployable in a way that takes advantage of the opportunities for optimization present in given problems. To accomplish this, the interconnect supports three different modes of operation: a static value in which a value set by the configuration data is provided to a functional unit, static source in which another functional unit serves as the value source, and a dynamic source mode in which the source is determined by the value from another functional unit.

6 Claims, 20 Drawing Sheets

U.S. PATENT DOCUMENTS

| | | | |
|---|---|---|---|
| 4,858,113 A | 8/1989 | Saccardi | 364/200 |
| 4,870,302 A | 9/1989 | Freeman | 307/465 |
| 4,873,626 A | 10/1989 | Gifford | 364/200 |
| 5,020,059 A | 5/1991 | Gorin et al. | 371/11.3 |
| 5,212,777 A | 5/1993 | Gove et al. | 395/375 |
| 5,233,539 A | 8/1993 | Agrawal et al. | 364/489 |
| 5,239,654 A | 8/1993 | Ing-Simmons et al. | 395/800 |
| 5,241,635 A | 8/1993 | Papadopoulos et al. | 395/375 |
| 5,261,077 A | 11/1993 | Duval et al. | 395/500 |
| 5,265,207 A | 11/1993 | Zak et al. | 395/200.31 |
| 5,301,340 A | 4/1994 | Cook | 395/800 |
| 5,305,462 A | 4/1994 | Grondalski | 395/800.1 |
| 5,327,540 A | 7/1994 | Heil et al. | 395/325 |
| 5,336,950 A | 8/1994 | Popli et al. | 307/465 |
| 5,426,378 A | 6/1995 | Ong | 326/39 |
| 5,428,803 A | 6/1995 | Chen et al. | 395/425 |
| 5,457,644 A | 10/1995 | McCollum | 364/716 |
| 5,465,375 A * | 11/1995 | Thepaut et al. | 712/15 |
| 5,557,743 A | 9/1996 | Pombo et al. | 395/186 |
| 5,613,146 A * | 3/1997 | Gove et al. | 712/20 |
| 5,684,980 A | 11/1997 | Casselman | 395/500 |
| 5,901,332 A | 5/1999 | Gephardt et al. | 395/861 |
| 5,956,518 A | 9/1999 | DeHon et al. | 395/800.15 |
| RE36,954 E | 11/2000 | Shindo et al. | 712/11 |
| 6,145,072 A | 11/2000 | Shams et al. | 712/22 |
| 6,219,775 B1 | 4/2001 | Wade et al. | 712/11 |

OTHER PUBLICATIONS

Ira H. Gilbert, et al., "The Monolithic Synchronous Processor," *Lincoln Laboratory, Massachusetts Institute of Technology, Lexington, MA 02173* (No Date Given).

G. Masera, et al., "A Microprogrammable Parallel Architecture for DSP," *IEEE*, pps. 824–827, (1991).

L. Wang, et al., "Distributed Instruction Set Computer," *Proceedings of the 1988 International Conference on Parallel Processing, vol. 1*, pps. 426–429.

M. Sowa, et al., "Parallel Execution on the Function–Partitioned Processor with Multiple Instruction Streams," *Systems and Computers in Japan*, 22(4):22–27 (Nov. 1991).

T. Alexander, et al., "A Reconfigurable Approach to a Systolic Sorting Architecture," *IEEE*, pps. 1178–1182 (1989).

Z. Blazek, et al., "Design of a Reconfigurable Parallel RISC–Machine," *North–Holland Microprocessing and Microprogramming 21*, pps. 39–46, (1987).

S. Morton, et al., The Dynamically Reconfigurable CAP Array Chip I, *IEEE Journal of Solid–State Circuits*, SC21(5):820–826 (Oct. 1986).

L. Snyder, "A Taxaonomy of Synchronous Parallel Machines," *Proceedings of the 1988 International Conference on Parallel Processing*, pps. 281–285 (Aug. 1988).

L. Snyder, "An Inquiry into the Benefits of Multigauge Parallel Computation," *Proceedings of the 1985 International conference on Parallel Processing*, pp. 488–492 (Aug. 1985).

A. DeHon, "DPGA Utilization and Application," *FPGA '96—ACM/SIGDA Fourth International Symposium on FPGAs, Monterey, CA*, (Feb. 11–13, 1996).

D. Epstein, "Chromatic Raises the Multimedia Bar," *Microprocessor Report*, pps. 23–27 (Oct. 23, 1995).

J. Labrousse, et al., "Create–Life: A Modular Design Approach for High Performance ASIC's," *IEEE CH2843*, pps. 427–433 (Jan. 1990).

M. Slater, "MicroUnity Life Veil on MediaProcessor," *Microprocessor Report*, pps. 11–18 (Oct. 23, 1995).

E. Tau, et al., "A First Generation DPGa Implementation," *FPD '95—Third Canadian Workshop of Field–Programmable Devices Montreal, Canada* (May 29—Jun. 1, 1995).

S. Kartashev, et al., "A Multicomputer System with Dynamic Architecture," *IEEE Transactions on Computer, vol. C–28, No. 10*, pps. 704–721 (Oct. 1979).

D. Bursky, "Programmable Data Paths Speed Computations," *Electronic Design*, pps. 171–174 (May 1, 1995).

V. Bove, Jr., et al., "Cheops: A Reconfigurable Data–Flow System for Video Processing," *IEEE Transactions on Circuits and Systems for Video Technology*, pps. 140–149 (1995).

M. Schaffner, "Processing by Data and Program Blocks," *Transactions on Computers, vol. C–27, No. 11*, pps. 1015–1027 (Nov. 1978).

J. Nickolls, "The Design of the MasPar MP–1: A Cost Effective Massively Parallel Computer," *IEEE CH2843*, pps. 25–28 (Jan. 1990).

B. Narasimha, "Performance–Oriented, Fully Routable Dynamic Architecture for a Field Programmable Logic Device," *UCB/ERL M93/42, University of California, Berkeley*, pps. 1–21 (Jun. 1993).

M. Bolotski, et al., "A 1024 Processor 8ns SIMD Array," *Advanced Research in VLSI 1995*, pps. 1–13 (1995).

D. Cherepacha, et al., "A Datapath Oriented Architecture for FPGSs," *Second International ACM/SIGDA Workshop on Field Programmable Gate Arrays ACM*, pps. 1–11 (Feb. 1994).

D. Jones, et al., "A Time–multiplexed FPGA Architecture for Logic Emulation," *Proceedings of the IEEE 1995 Custom Integrated Circuits Conference*, pps. 495–498 (May 1995).

G. Nutt, "Microprocessor Implementation of Parallel Processor," *Proceedings of the Fourth Annual Symposium on Computer Architecture*, pps. 147–152, (1977).

W. Kim, "MasPar MP–2 PE Chip: A Totally Cool Hot Chip," *Proceedings of Hot Chips V*, pps. 1–5 (Mar. 29, 1993).

E. Mirsky, et al., "Matrix: Coarse–Grain Reconfigurable Computing (Abstract)", *Published at the 5th Annual MIT Student Workshop on Scalable Computing*, pps. 1–2 (Aug. 1995) (Available on the Internet May 1, 1995).

E. Mirsky, et al., "Matrix: A Reconfigurable Computing Architecture with Configurable Instruction Distribution and Deployable Resources," *Published at FCCM'96—IEEE Symposium on FPGA's for Custom Computing Machines*, pps. 1–10 (Apr. 17–19, 1996).

Takashi Miyamori et al., "A Quantitative Analysis of Reconfigurable Coprocessors for Multimedia Applications," IEEE Symposium on Field–Programmable Custom Computing Machines Conference (FCCM98), Apr. 15–17, 1998.

Charlé Rupp et al., "The Napa Adaptive Processing Architecture", IEEE Symposium on Field–Programmable Custom Computing Machines Conference (FCCM98), Apr. 15–17, 1988, pp. 1–10.

Stephen M. Scalera et al., The Design and Implementation of a Context Switching FPGA, IEEE Symposium on Field–Programmable Custom Computing Machines Conference (FCCM98), Apr. 15–17, 1998.

* cited by examiner

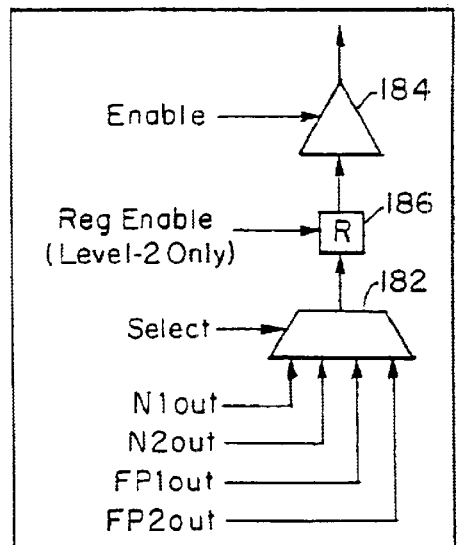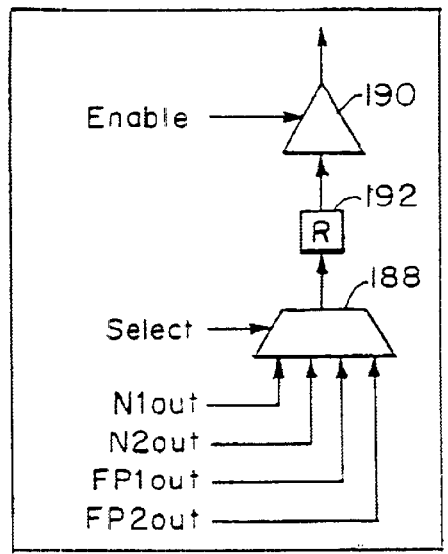
FIG. 14   FIG. 15
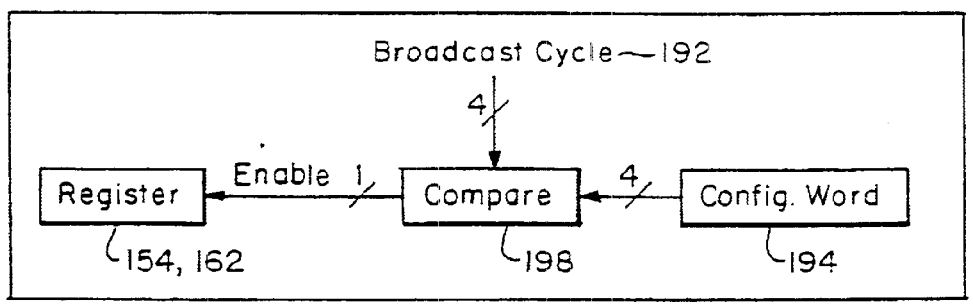
FIG. 16
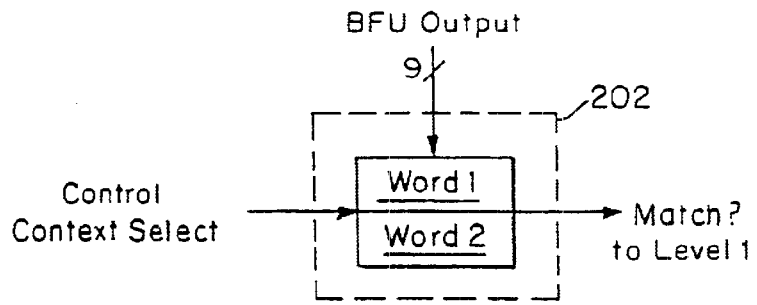
FIG. 17

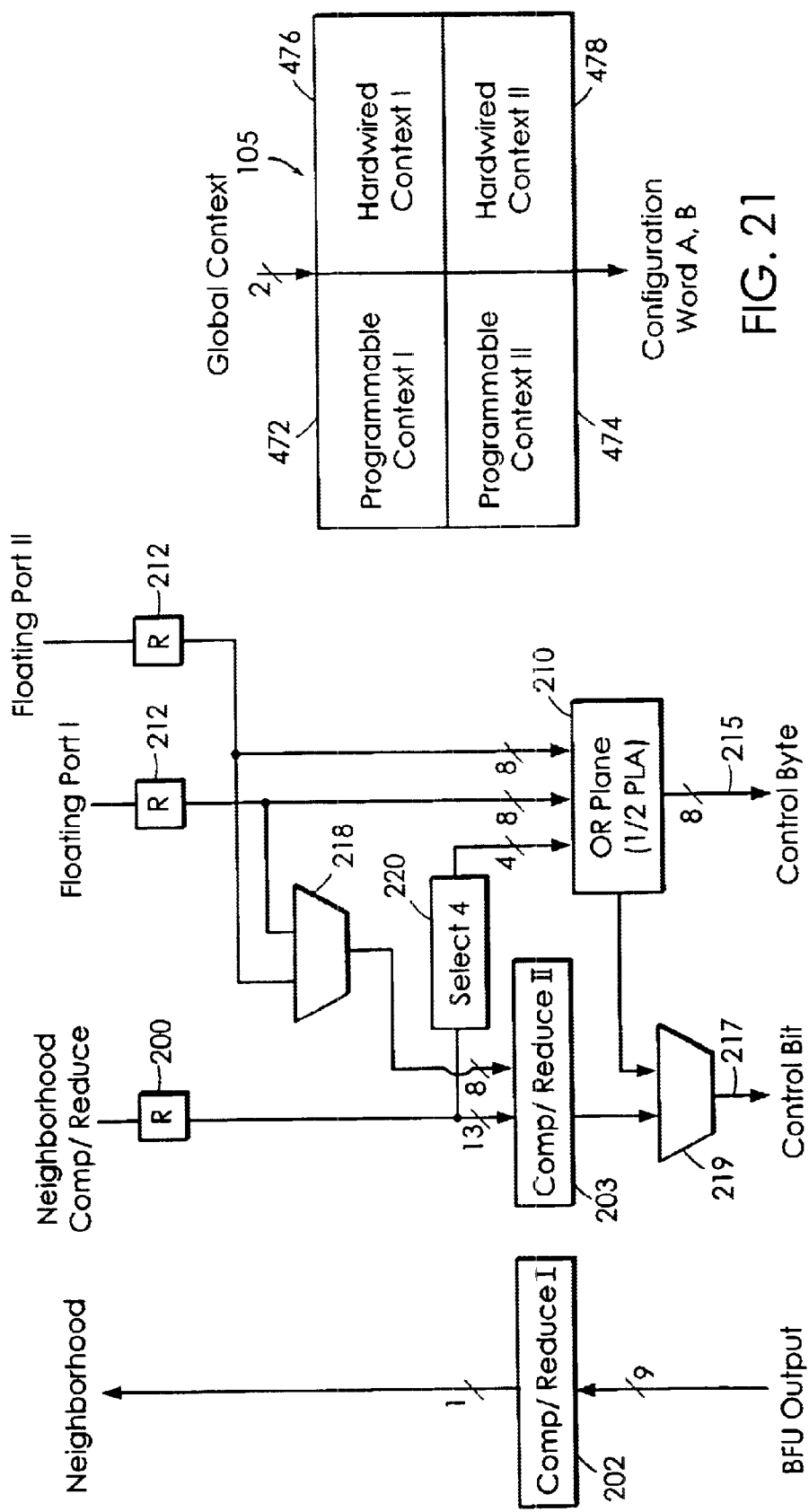

INTERMEDIATE-GRAIN RECONFIGURABLE PROCESSING DEVICE

RELATED APPLICATIONS

This application is a Continuation of U.S. application Ser. No. 09/892,812 filed Jun. 27, 2001, now U.S. Pat No. 6,496,918, which is a Continuation of U.S. application Ser. No. 09/292,497 filed Apr. 15, 1999, now U.S. Pat. No. 6,266,760, which is a continuation of U.S. application Ser. No. 08/632,371, filed Apr. 11, 1996, now U.S. Pat. No. 5,956,518, the entire teachings of which are incorporated herein by reference.

GOVERNMENT SUPPORT

This invention was made with Government support under the Advanced Research and Projects Agency (ARPA) of the Department of Defense under Rome Labs Contract No. F30602-94-C-0252. The Government has certain rights in the invention.

BACKGROUND OF THE INVENTION

Continuing advances in semiconductor technology have greatly increased the amount of processing that can be performed by single-chip, general-purpose computing devices. The relatively slow increase in inter-chip communication bandwidth requires that modern high performance devices use as much of the potential on-chip processing power as possible. This results in large, dense integrated circuit devices and a large design space of processing architectures.

One way of viewing this design space is in terms of granularity. Designers have the option of building very large processing units, or many smaller ones, in the same space. Traditional architectures are either very coarse grain, such as microprocessors, or very fine grain, such as field programmable gate arrays (FPGAs). Both architectures have advantages and disadvantages.

Microprocessors incorporate very few large processing units that operate on wide data-words, and each unit is hardwired to perform defined instructions on these data-words. Usually each unit is optimized for a different set of instructions, such as integer and floating point, and the units are generally hardwired to operate in parallel. The hardwired nature of these units allows very rapid instructions. In fact, a great deal of area on modem microprocessor chips is dedicated to cache memories in order to support a very high rate of instruction issue. Thus, the devices efficiently handle very dynamic instruction streams.

Very fine grain devices, such as FPGAs, incorporate a large number of very small processing elements. These elements are arranged in a configurable interconnect network. The configuration data used to define the functionality of the processing units and network can be thought of as a very large, semantically powerful, instruction word. Nearly any operation can be described and mapped to hardware.

SUMMARY OF THE INVENTION

Unfortunately, because microprocessors are highly optimized for simple, wide-word, dynamic instructions, they are relatively inefficient when performing other kinds of operations. For example, many cycles are required to build up complex operations that are not part of the processor's pre-selected instruction set. Also, when performing short-word operations, much of the processing unit is not being used, and when the instructions being issued are very regular, the large instruction caches are unnecessary. Thus, very coarse-grain microprocessors are not equipped to take the maximum advantage of these cases.

The size of the "instruction word" creates a number of problems with fine-grain FPGA devices, however. Reloading new instructions takes a relatively long time, making dynamic instruction streams very difficult for these devices. Moreover, if the operation being performed is, in fact, a wide word operation, a great deal of this "instruction word" must be dedicated to re-describing the operation for each of the small processing elements. Thus, fine grain processing elements are not well equipped to take advantage of a large number of common computing operations.

The present invention utilizes a large number of intermediate-grain processing elements which are arranged in a configurable mesh. Thus, the regularity and rapid instruction issue features of coarse-grain units are exploited, but a reconfigurable or programmable interconnect allows these units to be connected in an application-specific manner. This means that coarse-grain resources, such as memory and processing, can be deployed in a way that takes advantage of the opportunities for optimization present in any given problem. In addition, configuration memories may be deployed to take advantage of application specific redundancy.

In general according to one aspect, the invention features a programmable integrated circuit that comprises a logic units that perform operations on data in response to instructions and memories that store and retrieve addressed data. A configurable or programmable interconnect provides a mode of signal transmission between the logic units and memories. Configuration control data defines data paths through the interconnect, which can be address inputs to memories, data inputs to memories and logic units, and instruction inputs to logic units. Thus, the interconnect is configurable to define an interdependent functionality of the functional units. A programmable configuration storage stores the configuration control data.

Thus the present invention may be configured to operate according to a number of traditionally distinct computing architectures. For example, a centrally located functional unit may be assigned the role of arithmetic logic unit (ALU) with memories of surrounding functional units being configured to act as instruction caches, register files, and program counters. Wider data paths are accommodated by tying near-neighbor neighbor ALUs to each other. Wider instructions are achieved by configuring instruction memories of separate functional units as if they were a single memory. For a different problem, the same integrated circuit may be reconfigured to emulate a single instruction multiple data (SIMD) architecture. The logic units of rows of functional units are tied together to create wider data paths, and the rows perform separate serial tasks.

In specific embodiments, functional units may provide at least part of the instructions to logic units of other functional units. Also, the configuration storage may hold multiple contexts of configuration control data for reconfiguration of the programmable interconnect.

In other embodiments, the interconnect may support three different modes of operation: a static value in which a value set by the configuration data is provided to a functional unit or static source in which another functional unit serves as the value source. A dynamic source mode can be included in which the source is determined by the value from another functional unit.

In still other embodiments, each logic unit can also have programmable logic arrays on data paths between functional units which perform bit level logic operations. Additionally, reduction logic can be added that performs logic operations on the output of the logic units and passes a result to other functional units as control information. Network drivers are assigned to each unit to transmit received signals to other functional units. The sources of the signals received by the drivers may also be dynamic so that the sources are programmable by other functional units.

In general according to another aspect, the invention features an integrated reconfigurable computing device, which has functional units of multi-bit arithmetic logic units and memories. A configurable interconnect that connects the units includes function ports which determine the source of the instructions to the logic units. Network ports of the units are configurable by the functional units and determine the source of addresses to the memories and the source of data to the logic units and memories.

In general according to still another aspect, the invention can also be characterized in the context of a method for organizing signal transmission within an array of functional units. Data read from the memories of functional units may be transmitted as instructions to the logic units of other functional units. Also, data read from logic units may be transmitted as addresses for the memories of other functional units. Finally, the data read from functional units can also be used as data inputs for the logic units of other functional units.

In specific embodiments, the paths of the data and instructions are dynamic in response to control from the functional units. More specifically, static values, values from other functional units, and values from sources may be transmitted between functional units.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 14 shows the level-2 drivers of the present invention;

FIG. 15 shows the level-3 drivers of the present invention;

FIG. 16 shows BFU input registers of the present invention;

FIG. 17 shows the reduction logic in the BFU control architecture of the present invention;

FIG. 20 is a block diagram showing the control logic for a single BFU;

FIG. 21 shows an alternative embodiment of the configuration memory supporting multiple contexts;

DETAILED DESCRIPTION OF THE PREFERRED EMBODIMENTS

Figure 1:
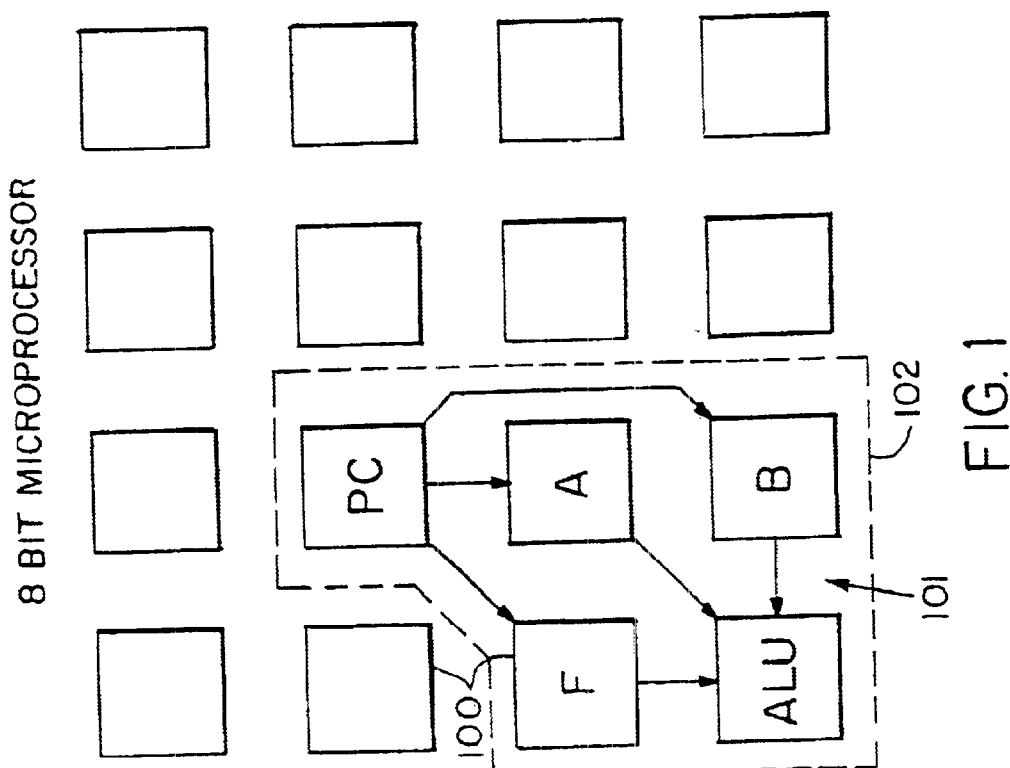
FIG. 1 shows a programmable integrated processing device of the present invention, which has been configured as an 8-bit microprocessor.

FIG. 1 shows a multi-bit microprocessor configuration of a reconfigurable processing device, which has been constructed and programmed according to the principles of the present invention. A two-dimensional array of basic functional units 100 are located in a programmable interconnect 101. Five of the BFUs 100 and the portion of the reconfigurable interconnect connecting the BFUs have been configured to operate as a microprocessor 102.

Each of the BFUs 100 preferably has addressable memory resources and logic resources, such as an 8-bit arithmetic logic unit (ALU). One of the BFUs 100, denoted ALU, utilizes its logic resources to perform the logic operations of the microprocessor 102 and utilizes its memory resources as a data store and/or extended register file. Another BFU operates as a function store F that controls the successive logic operations performed by the logic resources of the ALU. Two additional BFUs, A and B, operate as further instruction stores that control the addressing of the memory resources of the ALU. A final BFU, PC, operates as a program counter for the various instruction BFUs F, A, B.

Figure 2:
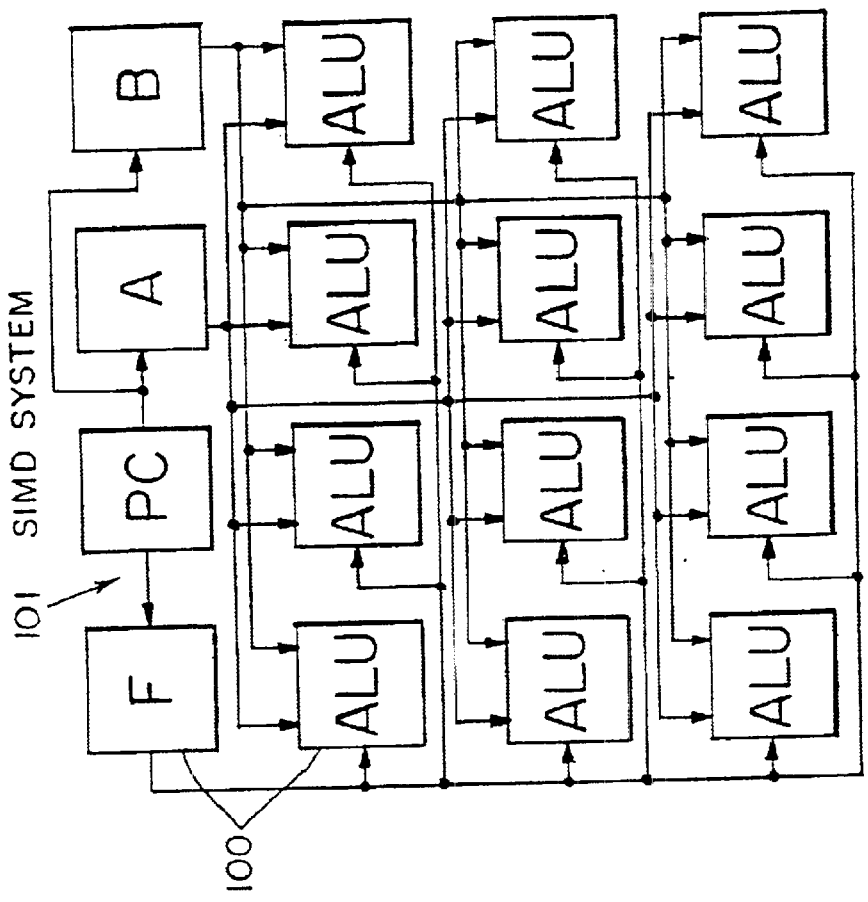
FIG. 2 shows a SIMD processor configuration for the processing device according to the invention.

As shown in FIG. 2, the same reconfigurable processing array, however, may be reprogrammed to function as a SIMD system, and as described below, this reconfiguration can occur on a cycle-by-cycle basis. The functions of the program counter PC and instruction stores A, B and F have been again assigned to different BFUs 100, but the ALU function has been replicated into 12 BFUs. Each of the ALUs is connected via the reconfigurable interconnect 101 to operate on globally broadcast instructions from the instruction stores A, B, F. These same operations are performed by each of these ALU, or common instructions may be broadcast on a row-by-row basis.

Figure 3:
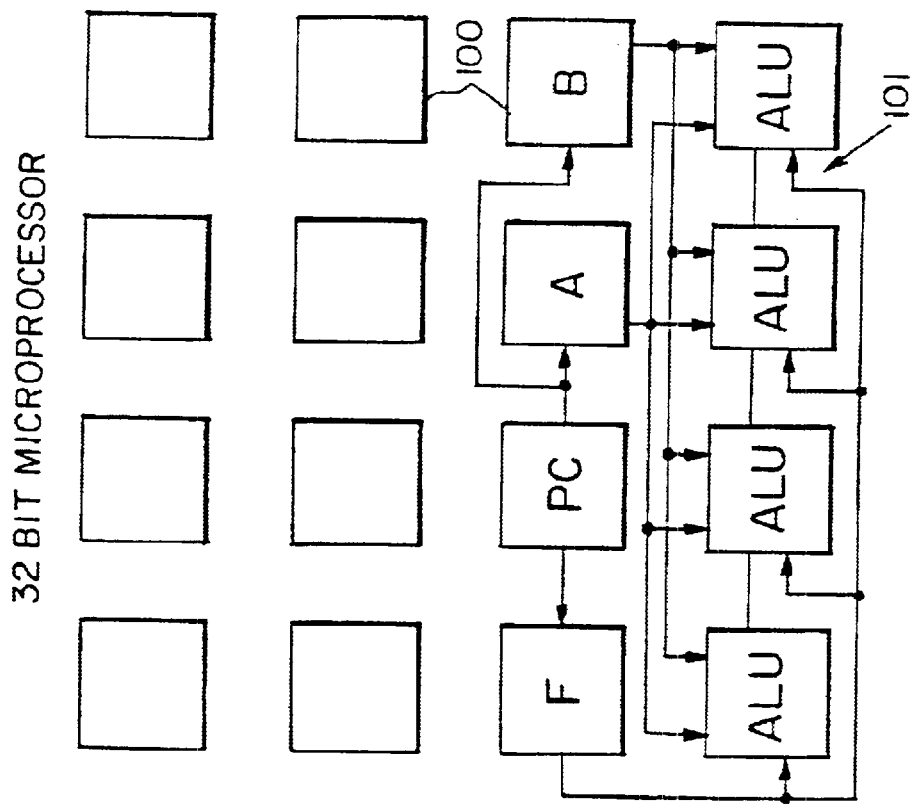
FIG. 3 shows a 32-bit processor configuration for the processing device according to the invention.

FIG. 3 shows how wider data paths can be constructed in the programmable device. This 32-bit microprocessor configured device has the same instruction stores A, B, F and program counter as described in connection with FIG. 1. Four BFUs, however, have been assigned an ALU operation, and the ALUs are chained together to act as a single 32-bit wide microprocessor in which the interconnect 101 supports carry-in and carry-out operations between the ALUs.

Figure 4:
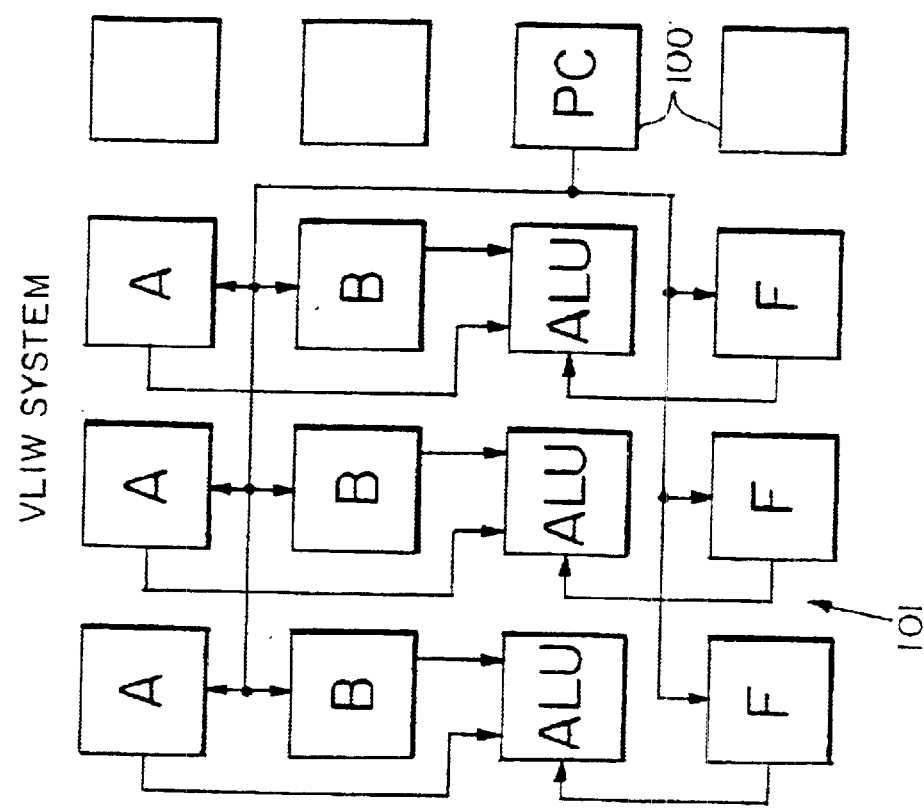
FIG. 4 shows a very long instruction word (VLIW) processor configuration for the processing device according to the invention.

FIG. 4 shows how the device can be configured to operate as a very long instruction word (VLIW) system. The various instruction stores A, B, F are defined to encompass multiple BFUs 100 to accommodate the desired instruction word width.

Figure 5:
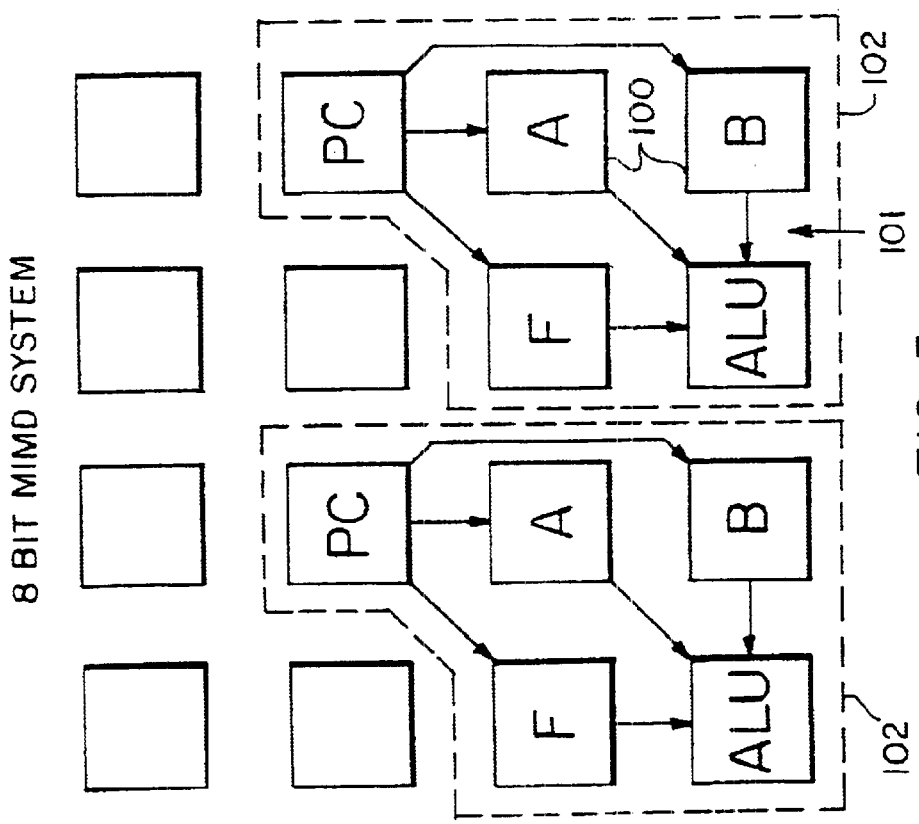
FIG. 5 shows multiple instruction multiple data (MIMD) processor configuration for the processing device according to the invention.

FIG. 5 shows the configuration of the present system to operate as a multiple instruction multiple data (MIMD) system. The 8-bit microprocessor configuration 102 of FIG. 1 is replicated into an adjacent set of BFUs to accommodate multiple, independent processing units within the same device. Of course, wider data paths could also be accommodated by chaining ALUs of each processor 102 to each other.

1. Basic Functional Unit Architecture

Figure 6:
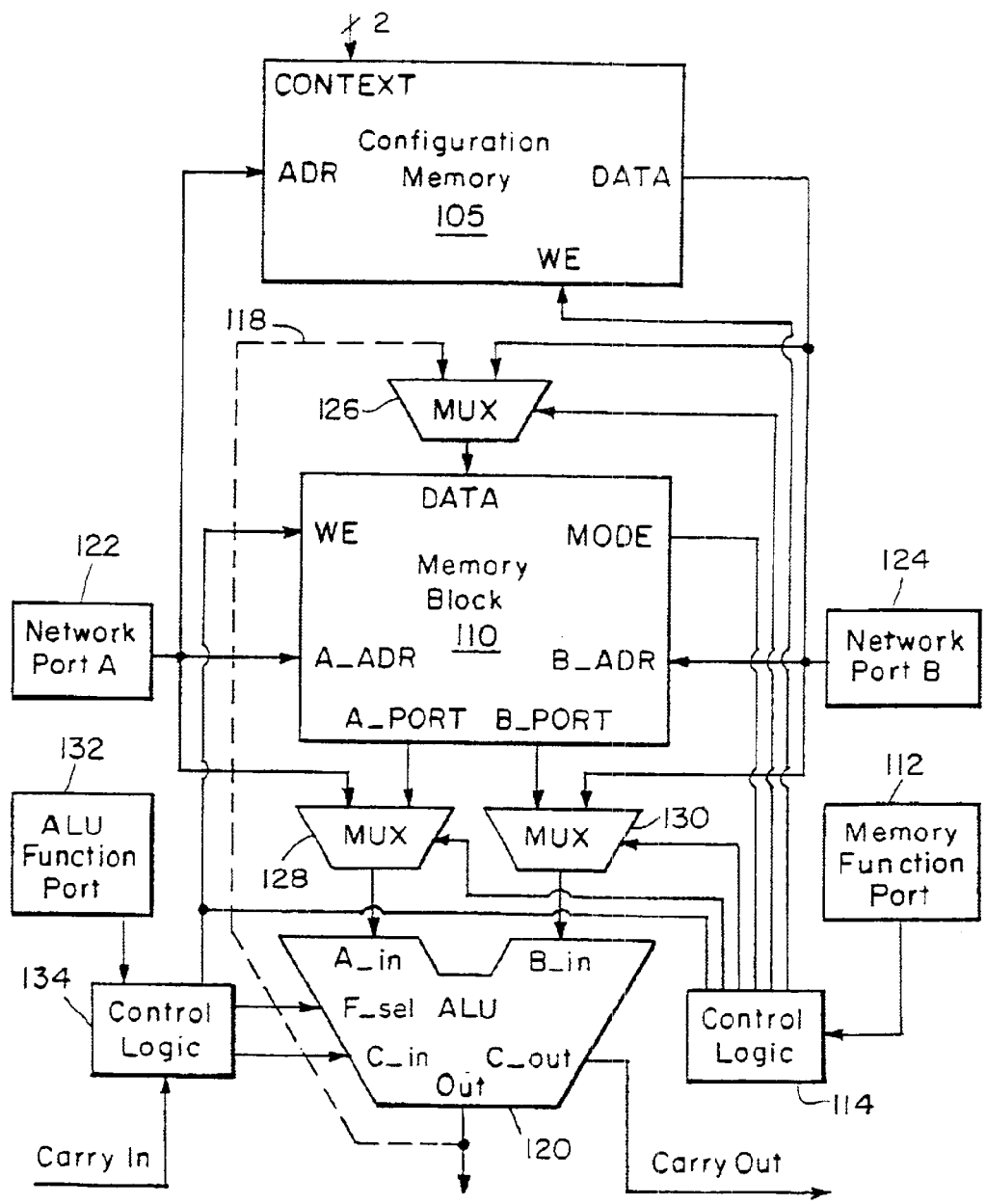
FIG. 6 is a block diagram showing the architecture of a basic functional unit (BFU) core of the present invention.

FIG. 6 shows the moderately coarse grain, preferably 8-bit, BFU core. Primarily, the BFU core has memory block 110, basic ALU core 120, and configuration memory 105.

The main memory block 110 is a 256 word×8 bit wide memory, which is arranged to be used in either single or dual port modes. In dual port mode, the memory size is reduced to 128 words in order to be able to perform the two simultaneous read operations without increasing the read latency of the memory. The memory mode is controlled by control logic 114 accessed through a Memory/Mux function port 112, and the write enable can be controlled either through the memory/mux function port 112 or by the control logic 134 accessed through ALU function port 132. Control logic is hardwired and also controls the ALU functions.

In single port mode, the memory 110 uses the A_ADR port for an address and outputs the selected value to both A_PORT and B_PORT. In dual port mode, the A_ADR port selects a value for A_PORT only, and B_ADR port selects a value for the B_PORT.

In either mode the read operation takes place during the first half of the clock cycle, and the values are latched for the rest of the cycle. Write operations take place on the second half of the cycle via the DATA memory port. Writes are always done to the current A_ADR address.

A feedback path 118 shown as a dashed line may be used. The BFU core performs "A op B→A" in one cycle. Two cycles are needed to perform "A op B→C" operations. In this case, the feedback is performed by the normal Level-1 network described in more detail later.

The configuration memory 105 stores configuration words that control the configuration of the interconnect. It also stores configuration information for a control architecture. Optionally, it can also be a multi-context memory that receives a globally broadcast 2-bit global context selecting signal. The memory is addressed via network port A 122 and receives data from port B 124. The write enable WE is issued by the control logic 114.

The ALU 120 is a basic 8-bit arithmetic logic processing unit. The following operations are supported:

Input Invert—Prior to performing any of the following operations either, or both of the ALU inputs, A_in or B_in, can be inverted.

Pass—Passes either A_in or B_in to Out. With the input inversion, this operation can be a NOT.

NAND—Performs bitwise operation: (A NAND B). With input inversions this can be an OR.

NOR—Performs bitwise operation: (A NOR B). With input inversions this can be a AND.

XOR—Perform bitwise operation: (A XOR B). With input inversions this can be a XNOR.

Shift—Shifts A or B either left or right one bit.

Add—Performs (A+B+C_in). C_in can be selected from 0, 1, or C_out of an adjacent cell. Combined with the input inversion a subtract can be made:

$$(A-B)=(A+\bar{B}+1).$$

Multiply—Performs (A*B). Can also perform (A*B+X) and (A*B+X+Y), where X and Y are special inputs. These operations are needed to create pipelined multiply structures. Multiply operations require two cycles to fully complete. The low byte is available on the first cycle and the high byte is available on the second.

The two network ports 122, 124 feed addresses to memory ports A_ADR and B_ADR. Data is feed to the memory 110 from Network port B via the memory DATA port. A data multiplexor 126 selects either the feedback back path 118 or the network port B output. Network ports A and B 122, 124 outputs can feed directly to the ALU 120 by configuring ALU input multiplexors 128, 130. The memory function port 112 controls the operation of the data and ALU input multiplexors 126, 128, 130 via the control logic 114.

The BFU core is designed to be smoothly chained to other BFUs to form wider-word ALU structures by properly configuring the control logic 134 via the ALU function port Fa. In order to accomplish this, the user must specify the carry-chain of each of datapath element as it travels through multiple BFUs by setting the following bits in each of the BFUs:

LSB—Set to "1" marks the least-significant-byte position.

MSB—Set to "1" marks the most-significant-byte position.

Rightsource—Specifies the direction to the next least-significant-byte, which can also be set to receive a carry from another source.

Leftsource—Specifies the direction to the next most-significant-byte, which can also be set to receive a carry from another source.

The source selection can be one of the following:

North—North BFU.

East—East BFU.

South—South BFU.

West—West BFU.

Local—The local BFU's carry from the previous cycle.

Control Bit—The local Control Bit.

Zero—Constant Zero.

One—Constant One.

In addition, pipeline stages can be inserted into the carry chain by specifying CarryPipeline to be "1". This will register the incoming carry prior to its being used. This is important for addition operations, because the carry-chain is limited by the clock period and the speed of the adder.

Based on this local information, the actual Shift and Add operations of the ALU 120 have different effects. There are two main shift functions: Left and Right. Left shift moves the bits towards the MSB, and right shifts move the bits towards the LSB. Normally, the carry-in value is used to fill the newly-created opening, but if the cell is an LSB or MSB, the new bit is determined by additional information contained the chosen shift instruction. For left shifts, the LSB position will be different, while for the Right Shifts it will be the MSB position. The options are:

Force Carry—This option will override the LSB/MSB setting and force the shift to use the carry-in from its designated source (Left/Rightsource). This is useful for shift-rotations.

Skip Bit—This option will keep the same LSBit/MSBit, essentially duplicating the low/high bit of the shifted number.

Insert 0—This will insert a zero into the LSBit/MSBit.

Insert 1—This will insert a one into the LSBit/MSBit.

There are three addition functions: Add, Add-0, and Add-1. Add will perform a normal add-with-carry (A+B+C_in), in all cases. Add-0 will perform a normal add-with-carry, except that the Carry-In of the LSB block will be forced to zero. Add-1 is similar, except that the LSB Carry-In is forced to one.

Note that a "normal" addition operation is usually performed with the Add-0 function. The basic Add operation is primarily intended for performing "block serial" addition in which addition is performed over multiple cycles on the same set of BFUs. The sequence would be an Add-0, followed by however many Adds are needed to complete the Addition.

Subtractions are performed using the Add-1 operation and inverting the B input value B, i.e., a 2's complement subtract.

There are four multiplication functions: Mult, Mult-Add, Mult-Add-Add and Mult-Cont. The first three initiate a multiply operation, performing A*B, A*B+X, or A*B+X+Y, respectively. The low byte of the product is available at the end of the current cycle. Mult-Cont is then issued in order to output the high byte. Mult-Cont does not have to be issued but must immediately follow a Mult, Mult-Add, or a Mult-Add-Add. The inputs to the multiply are latched on the cycle the Mult, Mult-Add or Mult-Add-Add is issued, so that the inputs to the BFU 100 may be changed during the Mult-Cont function, without affecting the final value.

The source for X and Y, if used, is special. There are two configuration bits associated with these inputs: MAdd1source and MAdd2source. If these are set to "0", the X and Y inputs are hardwired for use in pipelined multipliers. In this case the X input is connected to the nearest North neighbor (L1_N1), and the Y input is hardwired to the output of the NorthWest neighbor (L1_NW) of the previous clock cycle. If the MAddsource bits are set to "1" they allow floating port FP1 and floating port FP2 (described later) to select X and Y, respectively.

Multiple-BFU multiplication operations are more complex than multi-BFU addition or shifting, and will be treated as an application.

2. Network Architecture

The network that joins the BFU cores into a complete array is a three-level interconnect structure, incorporating regular neighbor mesh, longer switchable lines, and long broadcast lines.

a) Level 1

Figure 7:
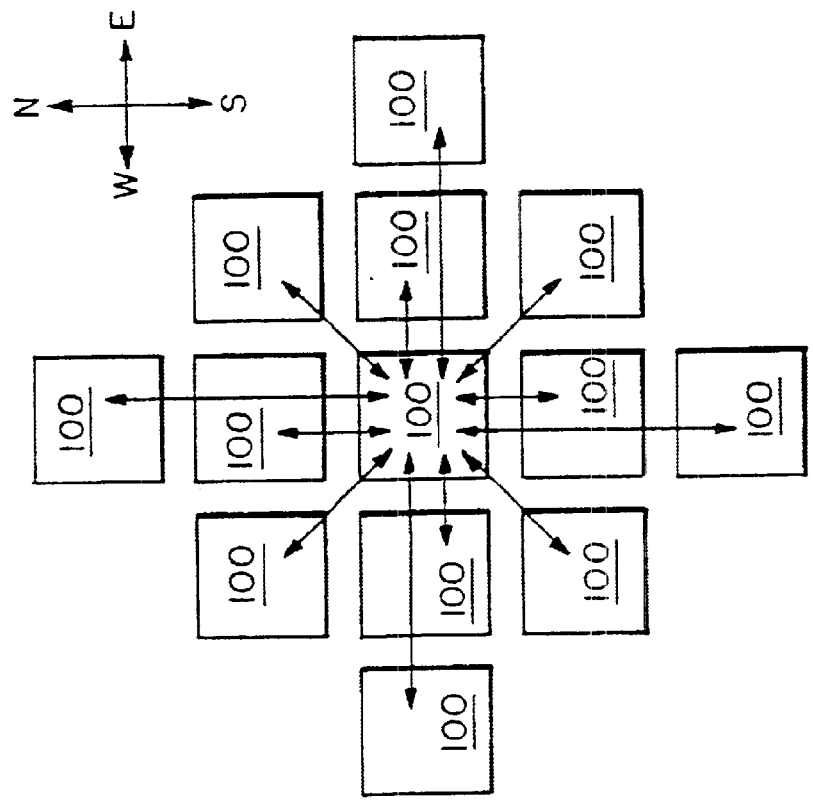
FIG. 7 is a block diagram showing the inter-BFU connectivity provided by the level-1 network connections.

FIG. 7 illustrates the connectivity provided by the Level-1 network structure. The output of every BFU core is passed to its nearest neighbors in all directions North, South, East, West, North-East, South-East, South-West, and North-West and its neighbors 2 cells away in the cardinal directions. As a result every cell receives 12 Level-1 inputs. This network is intended to provide fast connections between tightly packed cells.

b) Level 2

Figure 8:
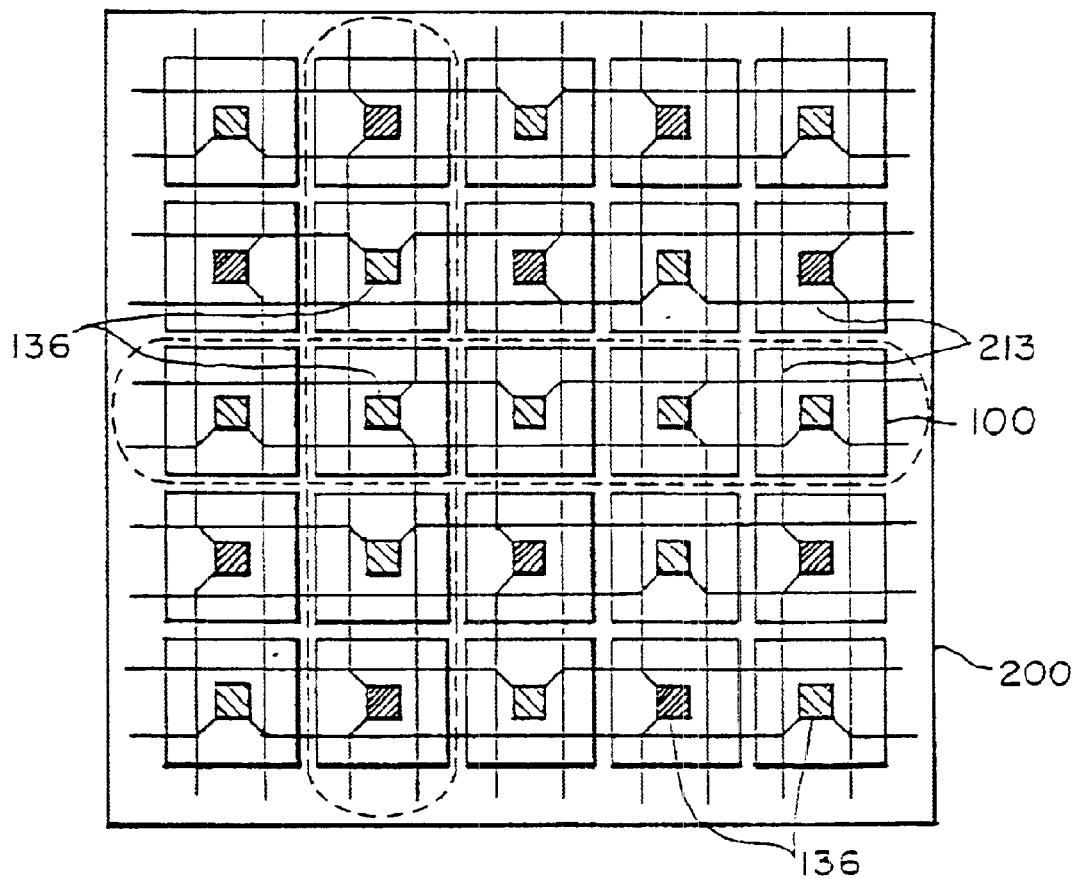
FIG. 8 is a block diagram showing the BFU interconnection provided by the level-2 network connections.

FIG. 8 shows the Level-2 network structure. This level provides length-4 broadcast lines between rows and columns of cells 200 containing a 5×5 array of BFU's 100. Blocks 213 represent two Level-2 network drivers. Each line shown is a 2-directional broadcast line where the starting drivers 213 are the source of the broadcast.

Level-2 drives operate in two modes: Source and Pass. Each switch 213 takes in the local BFU output, a byte from the control logic, the Level-1 and Level-3 network lines, as well as other Level-2 lines and selects one. In Source mode, this data is then registered and broadcast on the line on the next cycle. The register is used to add a pipeline stage in network.

In Pass mode, the data is broadcast without the pipeline stage. This allows longer chains of network lines. At some point, a pipeline stage must be inserted (by using a Source-mode switch) to keep the clock period small. The possible number of links in these chains depends on particular implementations of this design as well as the internal clock speed.

The two types of switches 136 on this network (vertical and horizontal broadcast) are arranged in a checkerboard pattern of BFUs, so that the same pattern can be found by moving north, east, south, or west two steps. This is important to consider for creating macrocell designs.

c) Level 3

The Level-3 network is intended to carry data long distances as rapidly as possible. It consists of 4 shared network lines spanning every row and column. Each BFU cell gets to drive up to 4 inputs onto the Level-3 network. In addition, every BFU has access to every Level-3 line crossing it.

The delay across Level-3 is also one clock cycle per step, except that steps at this level are up to a full-chip long. Thus it is possible to get from any BFU to any other BFU in the array in 2 clock cycles.

The control logic for the Level-3 bus line is located at the perimeter of the device's core. The select is broadcast down columns, then a next cycle the value broadcast is used to control the line.

3. Network Switches and Ports

Figure 9:
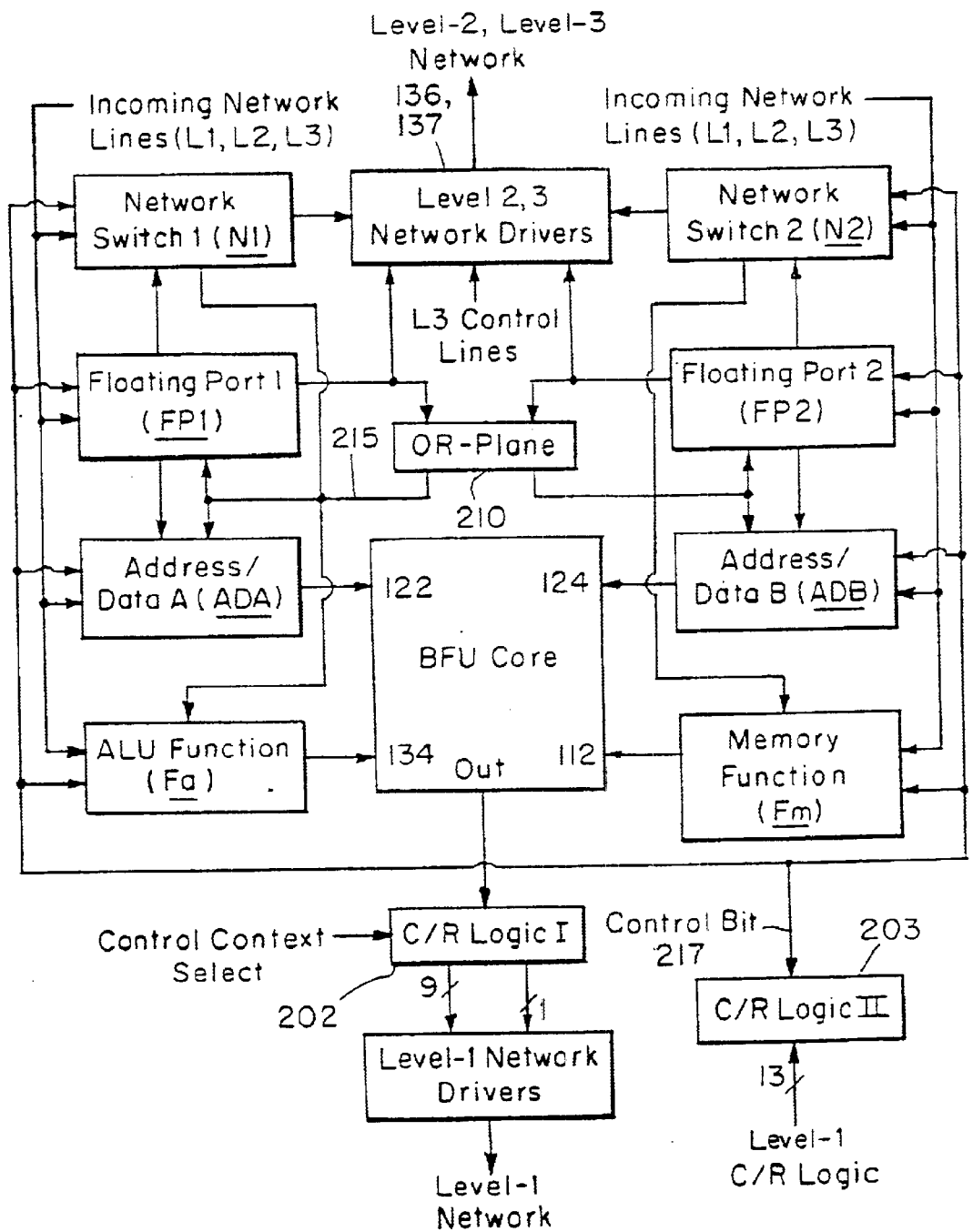
FIG. 9 is a block diagram showing the network switch architecture for a BFU of the present invention.

FIG. 9 illustrates the BFU cell 100, which is the smallest logic unit from which more complex processing units can be built. It provides the switching system that controls that data flow between BFUs on the reconfigurable interconnect.

Four switches, Address/Data A and B ADA, ADB, ALU Function Fa, and Memory Function Fm, feed data into the BFU core via the network ports 122, 124, ALU function port 132, and memory/mux function port 112, respectively, shown in FIG. 1. Four other switches, Floating Port switches FP1 FP2, and Network Switches N1, N2, feed data into the level-2 and -3 network drivers 136. When not being used as network selectors, floating ports FP1 and FP2 can serve to control the dynamic switching capability of the Address/Data A, B and Network Switches.

Each switch/port selects from its inputs to produce a single byte of output. Each type of switch/port, however, uses a slightly different mechanism for selecting this byte.

Also shown is C/R logic I and II 202, 203 and OR plane 210. These sections are part of a control architecture that generates a control byte 215 that may be selected as the output of the switches or a control bit 217 that is used to change the configuration bytes controlling the switches' functionality as part of local context control.

a) Function Ports

Figure 10:
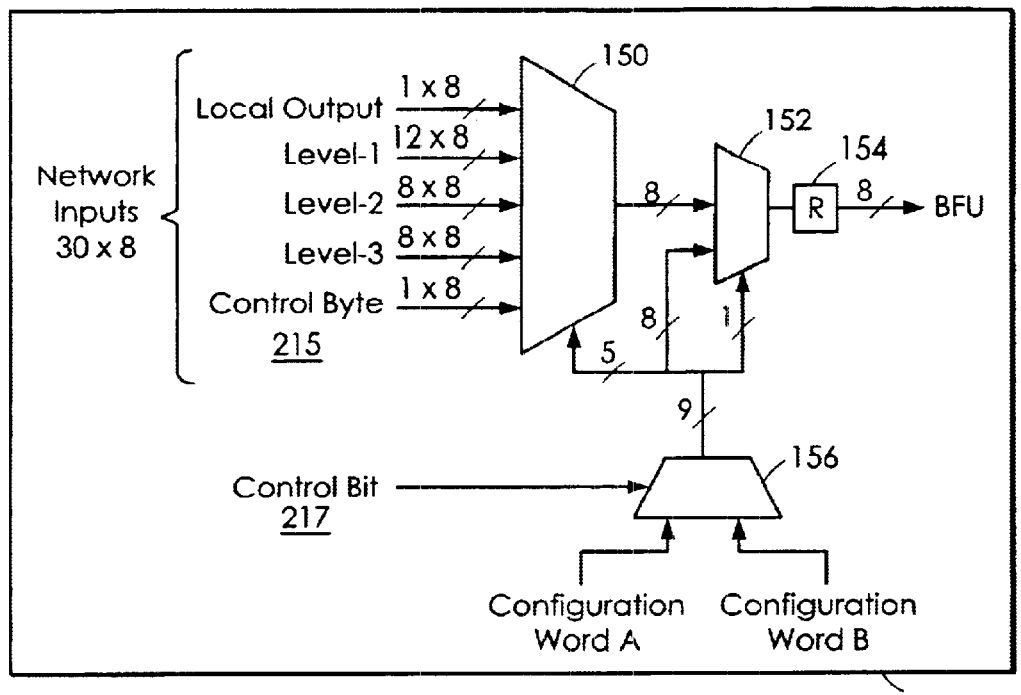
FIG. 10 is a block diagram illustrating the function switch architecture of the present invention.

FIG. 10 shows the architecture for each of the two function switches Fa and Fm that control, respectively, a BFU's ALU 120 and memory/multiplexors. The switches Fa,Fm take in 30 byte-sized values from the network at port multiplexor 150. These include the local BFU's output 118, all local Level-1 lines, all crossing Level-2 and Level-3 lines, and the single control byte 215 that is generated by the OR plane 210. The selected output of the port multiplexor 150 is provided to a value/source multiplexor 152 which is used to select either the output of the port multiplexor or a static value determined by configuration.

The port multiplexor 150 and value/source multiplexor 152 are controlled by a 9 bit configuration word. This word is interpreted one of two ways based upon the value of its 9th bit, which controls the value/source multiplexor 152. In Static-Value (Constant) mode, the lower eight bits of the configuration word are passed directly to the BFU via the value/source multiplexor 152. This allows the port's value to be pre-programmed. In the other mode, Static-Source, the lower 5 bits of the configuration word control the port multiplexor 150 to select from the 30 incoming lines and the value on this line is propagated to the BFU 100 through the value/source multiplexor 152.

The port takes in two configuration words, A and B, and uses a local control bit generated by the distributed compare/reduce logic 203 to select between the words at a local context multiplexor 156. This allows the control architecture to control the operation of the switch to operate in one of two locally generated contexts.

Finally, the output of the port passes through a register 154 clocked by a global clock. This provides the implicit pipeline stage of the architecture, i.e., entering a BFU constitutes a single pipeline stage.

b) Address/Data and Network Switch Ports

Figure 11:
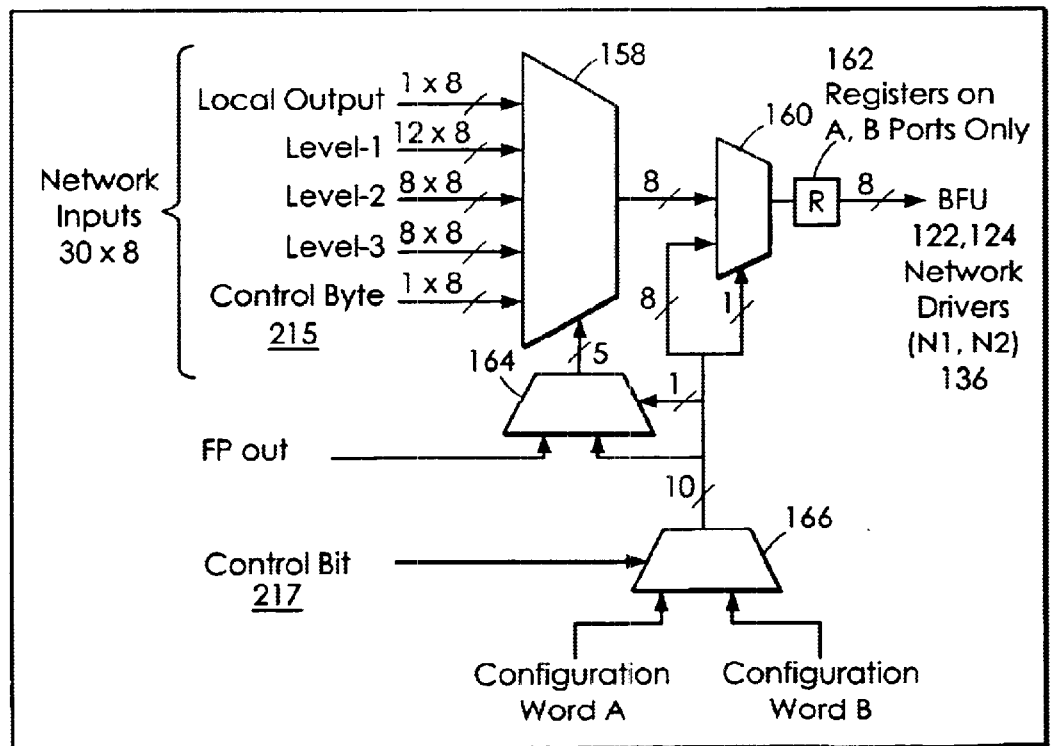
FIG. 11 is a block diagram showing the address/data and network switch architecture of the present invention.

FIG. 11 illustrates the architecture of the address/data and network switch ports ADA, ADB, N1, and N2. The architecture is very similar to the function port Fa,Fm that is described in connection with FIG. 10, except that in addition to Static-Value and Static-Source modes, it also provides a Dynamic-Source mode in which a floating port output FPout may be used to control the port multiplexor 158.

In more detail, the mode of the switch ADA, ADB, N1, N2 is determined by configuration word A or configuration word B from the configuration memory 105 based upon the control bit 217. The control bit is received at a selector port of local context multiplexor 166. One bit of the selected configuration word is received at the selector port of dynamic/static multiplexor 160. If this multiplexor selects the output of the associated floating port FPout, the port will function in a dynamic mode in which one of the 30 byte-sized values, a local output, 12 level-1, 8 level-2, 8 level-3 and the control byte 215 from the OR plane 210 of the distributed PLA, will be controlled dynamically by the floating port. Alternatively, however, the selection performed by the port multiplexor 158 can be determined by the selected configuration word; this is termed static source mode because the selected value is determined by configuration. Finally, the select bit can also control the value/source multiplexor 160 to pass a value determined by configuration. That is, instead of selecting the output of the port multiplexor 158, the value/source multiplexor 160 can select 8 bits determined by the selected configuration word. Thus, the switch's value can be fixed by the configuration word, come from a fixed source or come from a source that can be selected on a cycle-by-cycle basis.

Which floating port FP1 or FP2 is the source of FPout depends on the switch port involved. Floating port 1 FP1 controls network switch 1 N1 and address/data A ADA; floating port 2 FP2 controls network switch 2 N2 and address/data B ADB.

The register 162 on the output again provides the implicit pipelining for the Address/Data ports, but is not used for the Network ports.

c) Floating Ports

Figure 12:
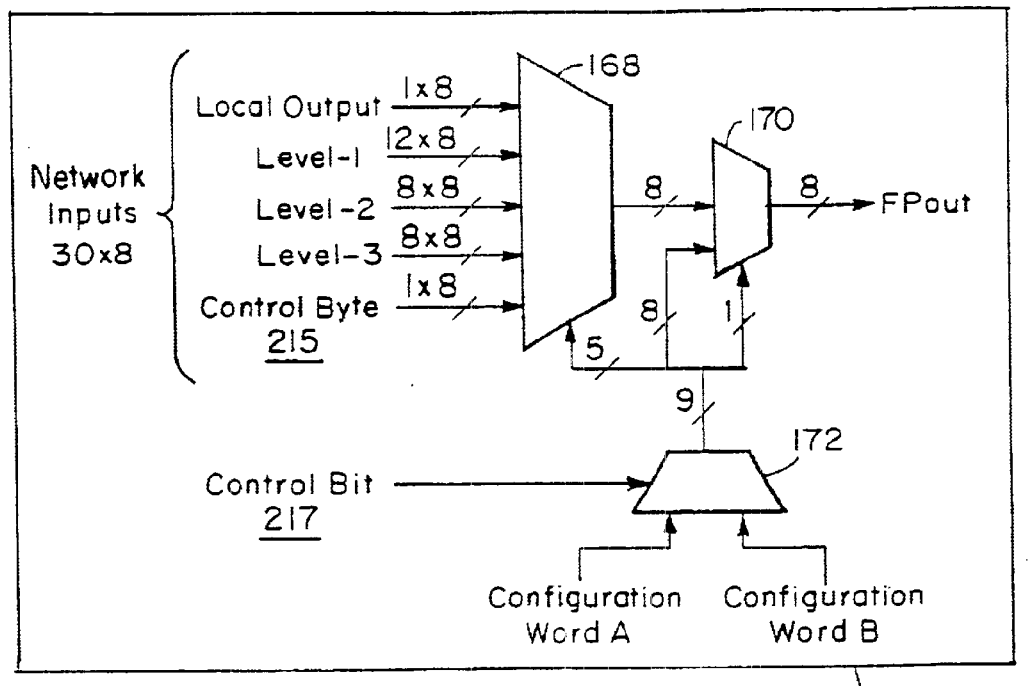
FIG. 12 is a block diagram illustrating the floating port architecture of the present invention.

FIG. 12 shows the floating port architecture FP1, 2, which is functionally similar to the function ports Fa,Fm. The floating ports FP1 and FP2 can be programmed to serve a number of different roles. First of all, they can serve as additional switching for the higher-level (Levels 2 and 3) network. They can also serve to control the dynamic source for the address/data ports ADA, ADB and the network switches N1, N2. Finally, they can also provide input to the OR Plane 210 of the control architecture.

These ports FP1, FP2 are physically identical to the function ports described above in connection with FIG. 10. A port multiplexor 168 selects from the 30 inputs based upon configuration data. A fixed value may be selected by value/source multiplexor 170. A local context multiplexor 172 selects the source of the 9 bit configuration word between words A and B based upon the control bit from the compare/reduce logic 203 or the OR plane 210. Different from the function ports Fa,Fm, however, there is no register on the output. This allows this port's output to be used by other ports immediately without pipeline delay, which is important if the floating port is providing dynamic control to another port.

d) Network Drivers

Figure 13:
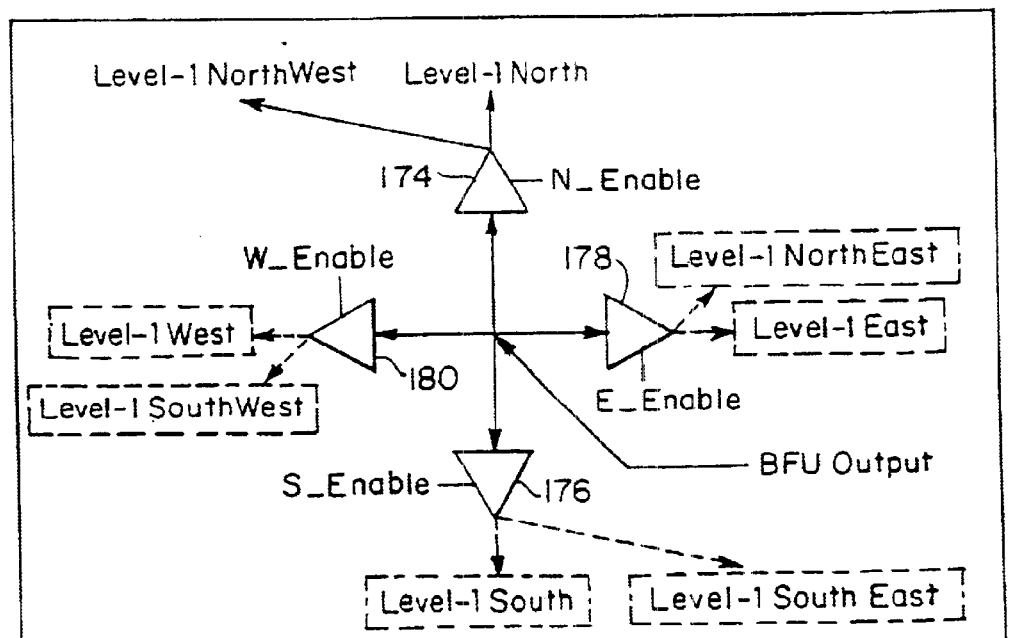
FIG. 13 is a block diagram showing the level-1 network drivers of the present invention.

FIG. 13 shows the Level-1 driving network that distributes the BFU output Out from the ALU 120 to the near neighbors as shown in FIG. 7. In an effort to conserve power, it is possible to turn off network wires that are not being used in a particular user's design. Each cardinal direction North, South, East and West has its own driver 174, 176, 178, 180, respectively, which can be disabled independently from other drivers via N-, S-, E-, and W-enable signals. The diagonals are joined with their clock-wise neighbor: North-West with North, North-East with East, South-East with South, and South-West with West. The Level-1 drivers 174–180 for each direction are preferably not tri-state, but instead pull each line to ground when disabled.

FIG. 14 shows an exemplary Level-2 driver 136 for a single Level-2 network wire. The Level-2 driver 136 is more complicated because there are four switches (N1, N2, FP1, FP2) that can drive to the line via the multiplexor 182.

One of the four switches FP1, FP2, N1, and N2 is selected to drive each line by the multiplexor 182. In the event that the line is not used, it can be completely disabled in the same way as the Level-1 lines by turning-off or disabling the buffer amplifier 184. Finally, the Level-2 network driver contains an optional register 186, which sets the Source/Pass mode of this L2 cell.

FIG. 15 shows a Level-3 driver 137, which is similar to the Level-2 version. A multiplexor 188 determines which of the floating ports or network switches FP1, FP2, N1, and N2 drives the line through buffer amplifier 190. The Level-3 network drivers are tristate, and are controlled globally. The register 192 is mandatory here.

Each BFU cell 100 contains two Level-2 drivers 136 (as shown previously in FIG. 8) and eight Level-3 drivers.

e) Registers and Time-switching

FIG. 16 shows a modification to the input registers 154, 162 of the function, network and address/data switches shown in FIGS. 10 and 11 to incorporate optionally a time-switching capability. If the basic configuration bit in each BFU, TSenable, is set to "1", then a globally-broadcast 4 bit word 192 selects which step the chip is on. If the broadcasted value 192 matches a 4-bit configuration word 194, comparison logic 198 controls the register 162, 154 to latch its values on that cycle in response to a one bit enable signal. Otherwise the register 162, 154 does nothing. This architecture can be used to time-multiplex use of the network wires.

In total, each BFU 100 requires 8 of these 4-bit configuration words. These registers control ports 122, 124, 134, and 112 of the BFU core along with: Control C/R, Control FP1, Control FP2, Write Enable, MAdd-1, and MAdd-2.

Time-switched control of the write enable means that write-enable only happens if WE is asserted (by whichever port is currently responsible) and if the global step matched the configured TS word.

4. Control Architecture

The control architecture of the embodiment of the invention is designed to be a general-purpose structure that can be programmed to fit the control requirements of a user's application. There are two main types of control: a fast reduction operation and a distributed PLA. Both will be described below. The bit-level details of these modules are listed in Appendix C.

Referring back to FIG. 9, the output of the BFU core Out first passes through compare/reduce logic 202 before being received by the level-1 network drivers for distribution to the level-1 network.

FIG. 17 shows the reduction logic 202 in the control architecture, which serves as general-purpose "condition codes" for the outputs of a BFU. The 9-bit output of the BFU 100 (data plus carry-out) is compared to one of two programmed configuration words: Word 1, Word 2. The Control Context Select, which is part of the ALU function, determines which word is used. These words can contain "don't care" bits, so it is possible to test any part of the BFU output. For example, a zero-detect function would test all of the data bits for zeros, but ignore the carry, while a sign-check would look only at the 8th (high) bit of the data and ignore the rest.

The result of this comparison 202 is passed to all the BFU's neighbors in the same style as the Level-1 network shown in FIG. 7, i.e., all adjacent BFUs and BFUs one removed along the cardinal directions. The Compare/Reduce (C/R) process continues on the all the incoming local C/R values.

Figure 18:
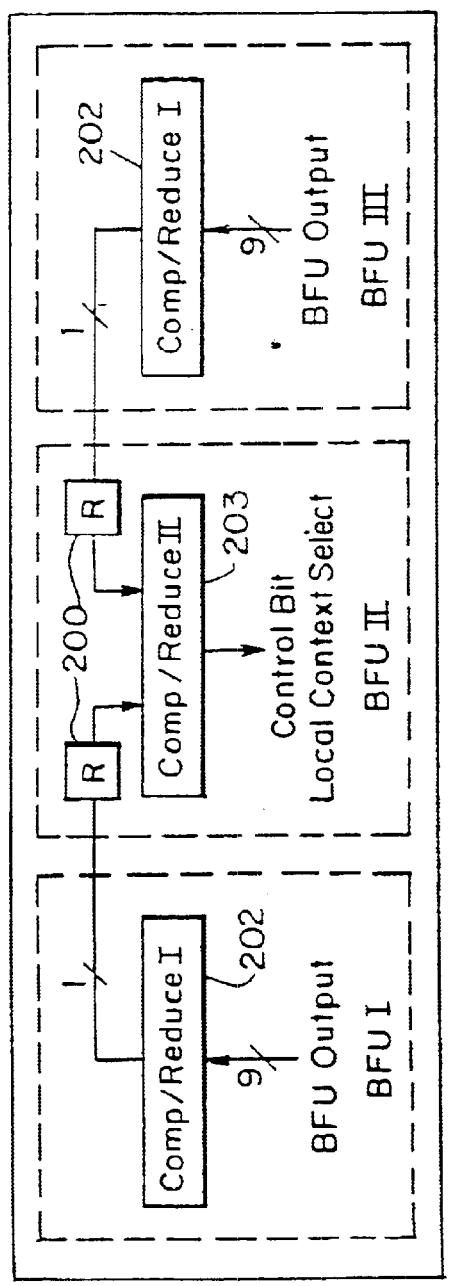
FIG. 18 is an example of multi-BFU reduction performed by the reduction logic of the present invention.

FIG. 18 shows an example of a multi-BFU reduction. The reduction logic I 202 outputs of BFUs I and III are passed to BFU II, where another C/R operation is performed in the BFU II's receiving reduction logic II 203. The final result is the local Control Bit 217 which is used to change the functionality of BFU II's ports and switches via the multiplexors 156, 166, 172 (see FIGS. 10–12). Note that there is a delay of one cycle for the Level-1 network connection provided by registers 200, just as data is delayed one cycle across the Level-1 network.

Referring back to FIG. 9, each of the BFUs also has an OR-plane 210 which performs a logic operation defined by the data stored in the configuration memory 105. The OR plane receives, as an input, the 8-bit output from each of the floating ports FP1, 2. The logic operation of the OR plane is applied to this output to generate the control byte that is received by each of the port multiplexors 150, 158, 168 of the function switches Fa, Fm, address/data switches ADA, ADB, the floating ports FP1, 2, and the network switches N1, N2 (see FIGS. 10–12). The OR plane 210 may also be used to generate the control bit that is also received by the switches, instead of the C/R logic 203.

Figure 19:
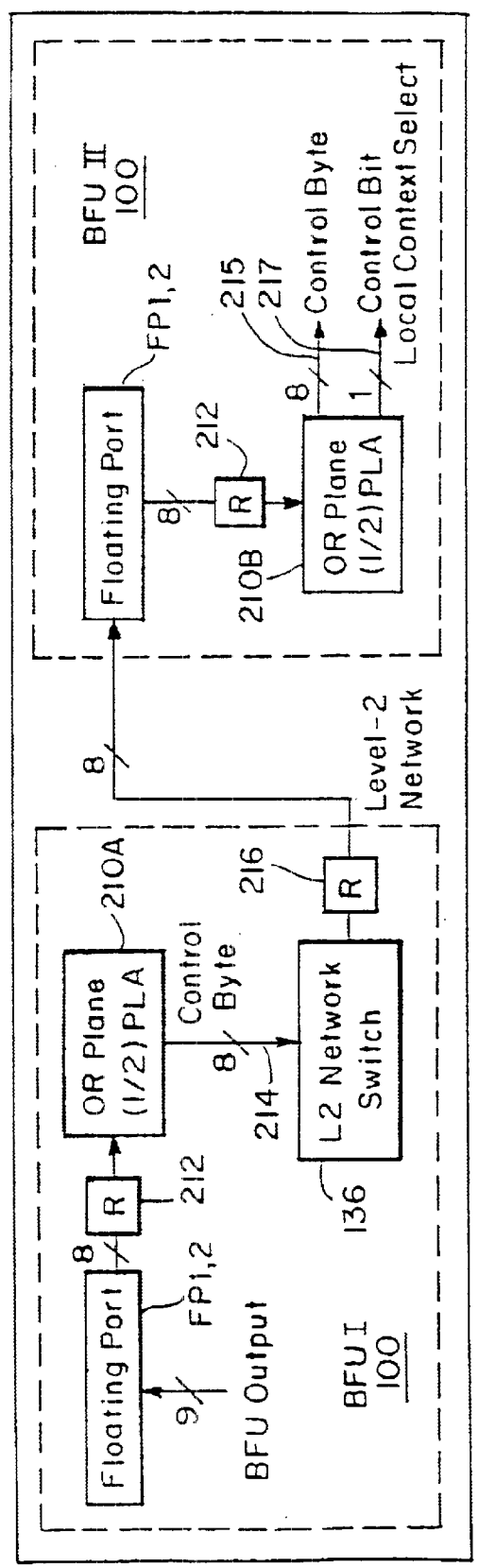
FIG. 19 is a block diagram illustrating the operation of the distributed programmable logic array (PLA) associated with each BFU according to the invention.

FIG. 19 shows the use of a distributed programmable logic array (PLA) of OR planes 210 for more complex control operations that can not be handled by the C/R logic 202, 203. In the example, the BFU output from BFU I gets passed to an OR plane 210A, which is half of a PLA. The fact that a floating port FP1, 2 is used to switch BFU Output allows any of the other floating port's inputs to serve as the initial data source. The register 212 after the floating port provides the necessary pipeline stage if the data used is coming off a long network line.

The OR plane 210A serves as one stage of a multi-level logic function. Therefore, its eight outputs 214 can be thought of as product-terms of a standard PLA. These product terms are then passed to a Level-2 or Level-3, network as the control byte input to a floating port FP1, 2, or network switch N1, N2.

After the one cycle delay from crossing the network via a second register 216, one of BFU II's floating ports FP1, 2 switches the product terms to its OR plane 210B. This plane 210B performs the second stage of the multi-level logic function. If more stages were required to achieve the desired logic operations, the 8 new product terms 215 could be sent to another BFU to continue the operation. In the example shown, only two levels from BFU I and BFU II are required.

In the distributed PLA model of the control logic, there are two final results. The first is the same as the C/R logic 202: the local Control Bit 217. However, the PLA 210B can also output a Control Byte 215, which can be inserted into a BFU port via address/data switches ADA, ADB or Function switches Fa, Fm or network switch. This allows the control logic to generate specific constants.

Note that the distributed PLA control requires three cycles to complete a two-level logic operation indicated by registers 212 and 216 on the paths from the floating ports FP and between BFUs, respectively. The PLA 210, however, is capable of performing complex logic operations as well as distributing this control across large portions of a BFU array via the Level-2 and Level-3 network spans. On the other hand, the C/R 202 logic operates in a single cycle, but is limited in functional complexity and distance.

FIG. 20 shows the complete control logic for a single BFU to illustrate the interoperability of the C/R logic 202, 203 and the OR plane 210. The Comp/Reduce I 202 is performed as described above where the result is simply passed to neighboring Level-1 BFUs, while the Comp/Reduce II 203 is linked with the OR plane 210. This connection allows these two types of control logic to be mixed. For example, the neighborhood Comp/Reduce can be used as an input to the OR plane 210, or the outputs of the floating ports FP1, 2 can used in the Comp/Reduce II operation.

In order to reduce the size of these reduction operations, a number of pre-selections are made on the incoming data. Comp/Reduce II 203 operates on all 13 C/R inputs from the neighbor C/R logic registered at 200, but can only include one of the Floating Port values selected by multiplexor 218. The OR Plane 210 takes in both floating ports FP1, 2 to enable logic combination of the outputs. Only 4 bits of the C/R inputs are received via selector 220, which can select any 4. One final bit of configuration selects the source of the Control Bit, either C/R II 203 or OR plane 210 at the multiplexor 219. The selection of the multiplexors 218, 219 and the select 4 logic 220 is set by the configuration data in configuration memory 105.

Optionally, the reconfigurable processing device may be adapted to have a global context selection in the style of dynamically programmable gate arrays (DPGA) described in U.S. patent application Ser. No. 08/386,851, now U.S. Pat. No. 5,742,180, having common inventors with this application and entitled "Dynamically Programmable Gate Array with Multiple Contexts", the teachings of which are incorporated herein by this reference in their entirety. As described in connection with FIGS. 10–12, each of the switches Fa, Fm address/data A, B, and network ports N1, N2 receive a control bit 217 that determines local context selection between configuration word A and B. As a modification, each of the BFUs 100 could be additionally provided with a 2-bit globally broadcast context signal.

As shown in FIG. 21, the configuration memory 105 is divided into 4 contexts, two of which are programmable 472, 474 and two of which are hardwired 476, 478. The two bit global context select signal selects which portion of this configuration memory 105 is active and the active context determines the configuration words A, B. The two programmable contexts 472, 474 are user programmable. Hardwired contexts 476, 478 may not be changed, however. These are most useful in a power up situation to ensure that the device is initially in a known state such as boot strapping.

6. Perimeter/Boundary Logic

Figure 22:
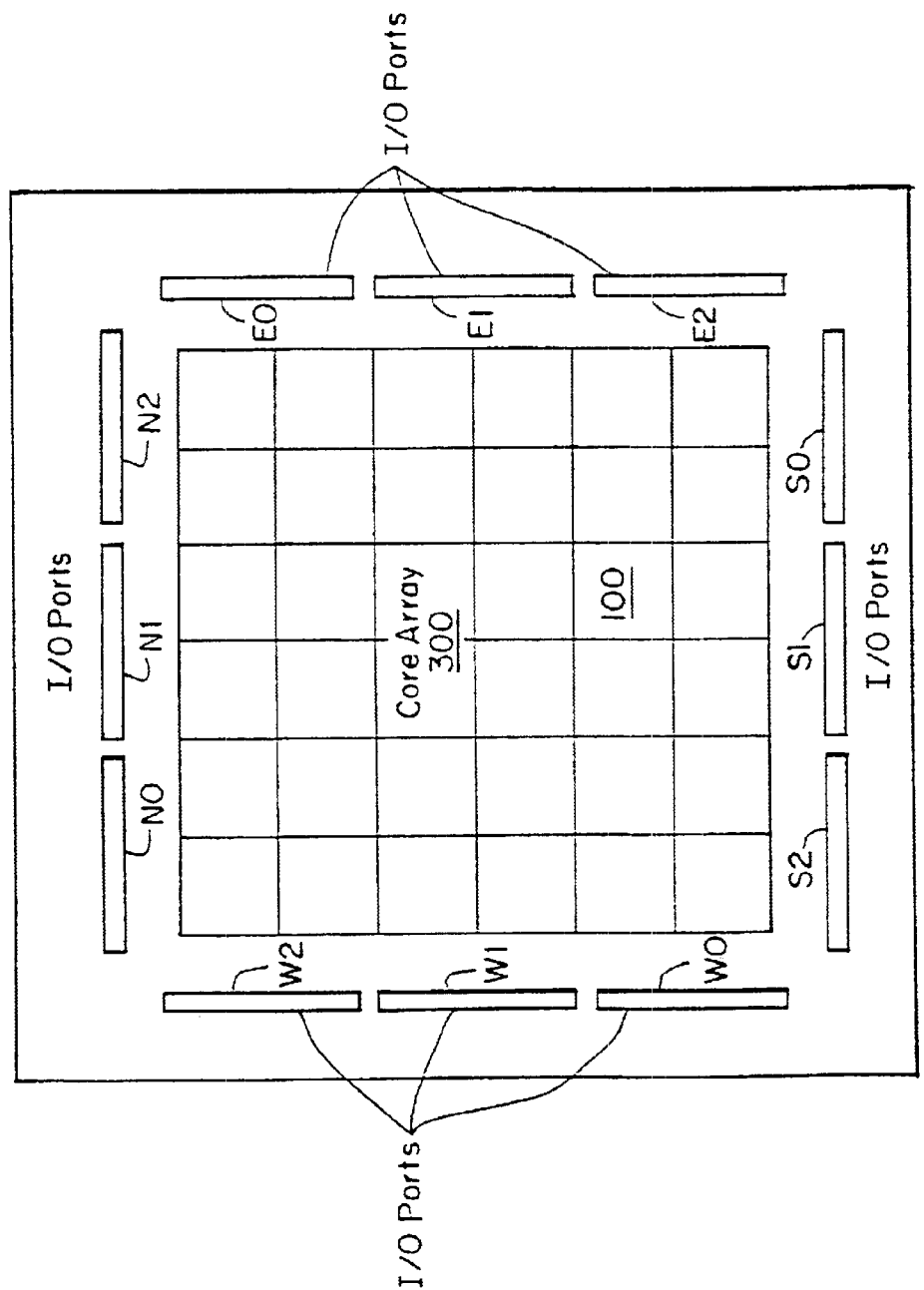
FIG. 22 is a block diagram of the configurable logic device of the present invention in the form of an integrated chip.
Figure 23:
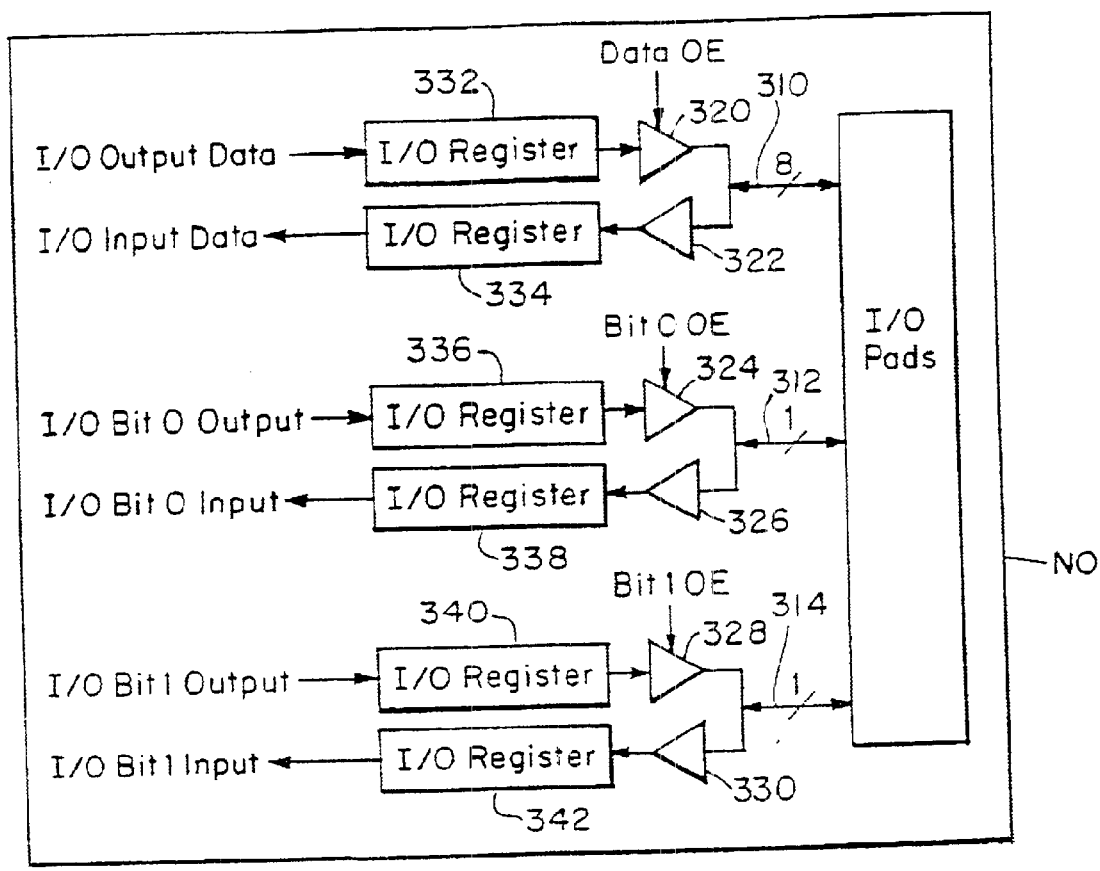
FIG. 23 is a block diagram showing the input/output port architecture for the chip of the present invention.

FIG. 22 shows a core 6×6 array 300 of BFUs 100 surrounded by 12 I/O ports, 3 to a side. This exact number of BFUs in the core 300 may change for different embodiments, but the structures described here will still apply. Also the number of I/O ports may change in different implementations along with the ratio of BFUs to I/O ports.

The following description concerns the switching logic that connects the core array 300 to the I/O ports N0-2, S0-2, E0-2, W0-2 and vice-versa. Throughout this section "output" refers to data leaving the chip, and "input" refers to data entering the chip. For simplicity, the remainder of this section will describe the north-side boundary, i.e. output signals going north, input signals going south. The chip boundary is symmetrical so that each of the other sides is an exact, but rotated, duplicate of the north side. Any exceptions to this will be noted. The ports will numbered clockwise, so the west-most port on the north side is Port N0, the east-most is Port N2, and similarly for the remaining sides.

Figure 24:
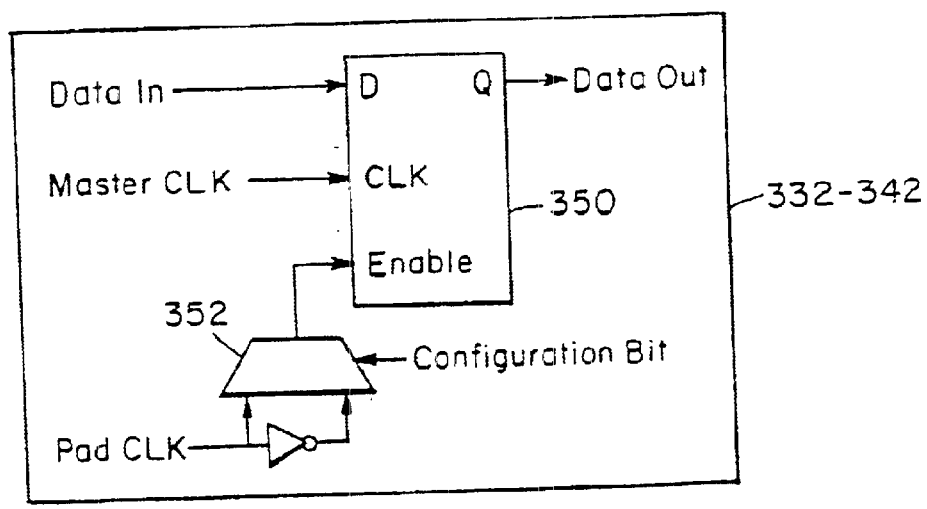
FIG. 24 is a block diagram showing the structure of an I/O register according to the invention.

FIG. 24 shows the architecture of an input/output (I/O) port N0, for example. The port N0 supports an 8-bit I/O databus 310 and two I/O control bits 312, 314. The data bus 30, and the two bits 312, 314 are controlled by independent Output Enable signals Data_0E, Bit0_0E, and Bit1_0E that control separate buffer amplifiers 320–330, which change the port, and the pads, from input to output mode. All data, in or out is registered using I/O registers 332–342. Note that in output mode, the I/O Input value will be the same as the I/O Output value, after two cycles of delay. The input data, for example, propagates through I/O register 332 to I/O register 334.

The I/O Registers 332–342 are designed to help synchronize internal signals to an external system. The chip takes in a master clock and uses that clock to generate all its internal clocking. One of those internal clocks is a Pad Clock, which is a half-frequency version of the master clock, one phase of the master clock delayed. This pad clock is used to synchronize the input and output data at the pads. Note that the chip runs internally at twice the rate of data I/O.

FIG. 24 shows how the I/O Registers 332–342 work. A standard D flip-flop 350 latches on the rising edge of the Master CLK. The latching is enabled with either the pad clock or its inversion in dependence on the configuration bit received at multiplexor 352. This allows a user to latch the signal on either edge of the Pad CLK. The selection is controlled by a user-programmed bit. In the hard-wired programming contexts, this is set so that the input registers trigger when Pad CLK is high, and the output registers trigger when Pad CLK is low. This is equivalent to the rising and falling edges, respectively, of Sync CLK the clock used to signal the external system.

Figure 25:
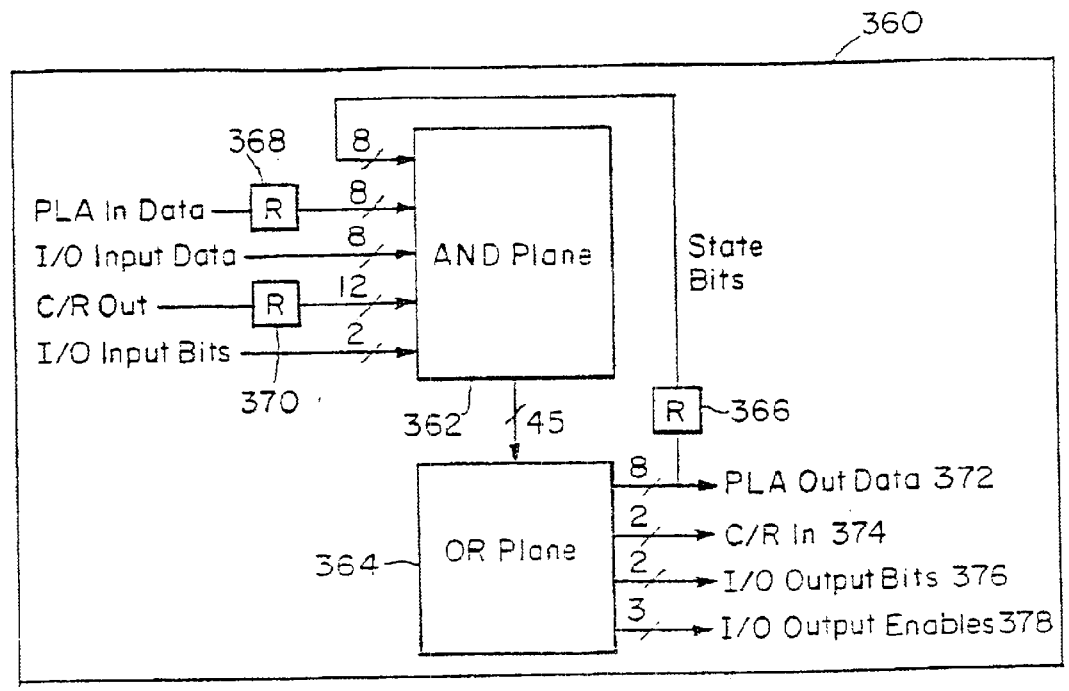
FIG. 25 is a block diagram of a programmable logic array for customizing the chip's interface.

FIG. 25 is a block diagram of a programmable logic array (PLA) 360 that is used to provide a customizable interface with any or most external systems. This fully programmable logic array (PLA) is placed next to each I/O Port N0-2, S0-2, E0-2, W0-2.

The PLA takes in 38 bits of data and the data's inverses and performs a selective AND in AND plane 362, generating 45 product terms. These product terms are then selectively ORed in OR plane 364 to generate 15 final outputs. Eight of these output bits are registered 366 and fed back into the input of the PLA 362 to be used as state bits for an up-to 256-state machine.

The input bits include the 8 state bits, a special PLA input byte, the I/O Input Data byte from the I/O Port, the Compare/Reduce bits that arrive at the north edge of the core and the two special bits from the I/O Port. The special PLA Input Data is a byte selected from all the network lines arriving at the north edge of the core. This byte is selected in the same manner as the I/O Port Data Outputs described below. The registers 368, 370 on the PLA In Data and the C/R Output bits are necessary because of the distance those bits must travel in order to get to the PLA.

The output bits of the PLA 360 include an 8-bit value 372 used as state bits to implement a finite state machine, a special PLA Output byte used to feed data into the core or both. In addition, the PLA outputs 2 bits 374 to be used as inputs to the C/R network in the core, 2 bits 376 to be output as the I/O Port's special bits, and the 3 I/O Output Enable Bits 378. Note that there are pipeline stages on the PLA Out Data and C/R In bits, but these registers will be included in the input switching.

Figure 26:
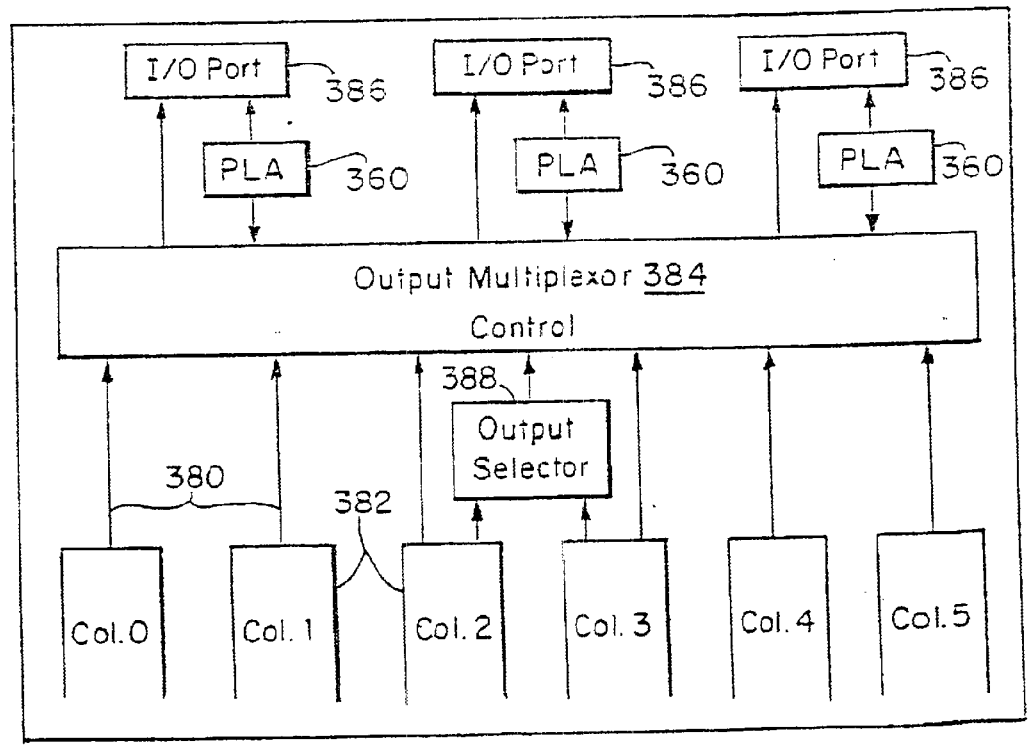
FIG. 26 is a block diagram showing the movement of data from the BFU core off-chip according to the invention.

FIG. 26 shows a block diagram of how data from the BFU core gets off-chip. Eight databuses 380 arrive at an output multiplexor 384 from the edges of every one of the columns 382 of BFUs. The eight databuses 380 include 2 Level-1 lines, 2 Level-2 lines, and 4 Level-3 lines. Diagonal lines are ignored here because the chip side will be viewed as a whole, and the diagonals are simply duplicates of the Level-1 lines. For a 6 column-wide core, this totals 48 byte-sized signals that are vying for 3 I/O ports 386, and 3 Input bytes to PLAs 360. In order to ensure generality, each of these values will be selected from all 48, plus the 3 outputs of the PLAs for the I/O Port inputs.

This selection is performed in a manner similar to the Level-3 Network lines. An Output Selector 388 for each of these 6 outputs is located at the center of the edge. The selector takes in the outputs of the 2 center BFU's columns 382 and the inputs from the I/O Ports and PLAs and chooses one (or a constant) to control which of the 48 core outputs is to be driven on to that output wire.

Figure 27:
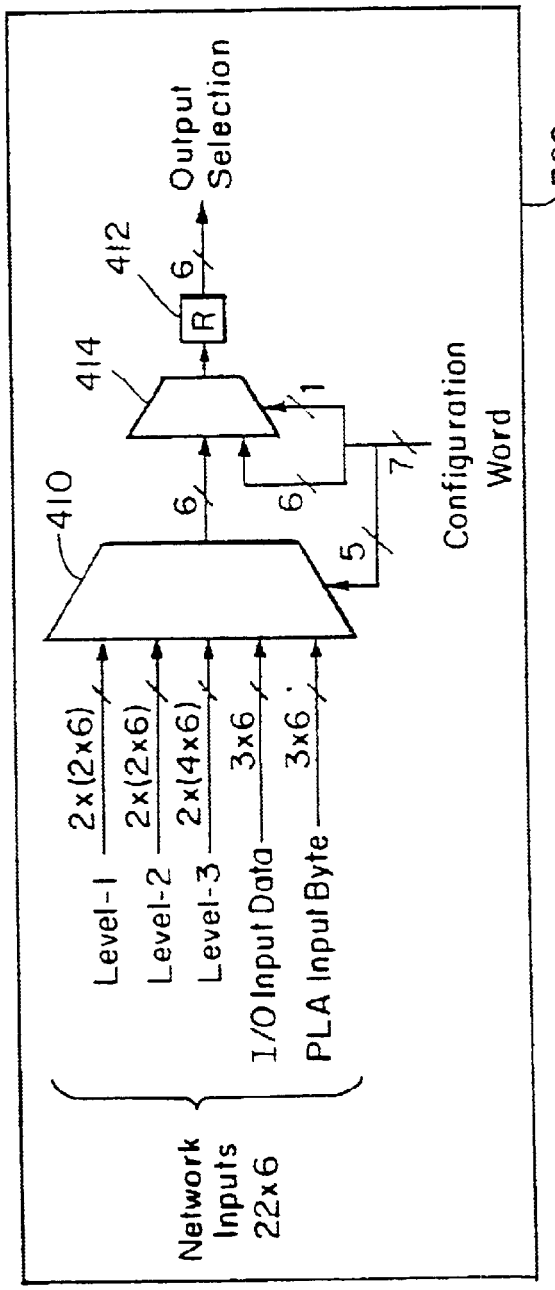
FIG. 27 is a block diagram of a selector switch that chooses the core outputs to be driven on an output wire according to the invention.
Figure 28:
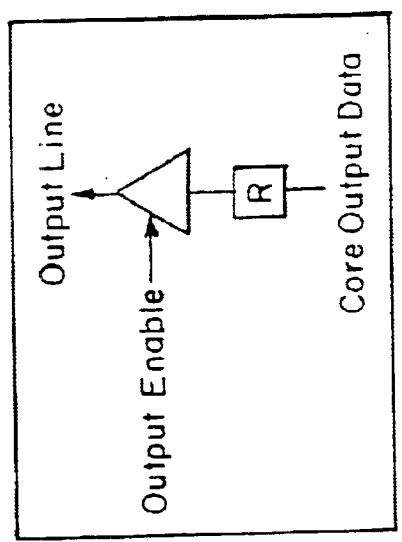
FIG. 28 is a block diagram showing a tri-state buffer used in the selector switch of FIG. 20.

FIG. 27 shows one of these selector switches 388. The output selection may come from either of the two center columns via multiplexor 410 or be set by the configuration via multiplexor 414. The register 412 on the output of the multiplexor 410 is used to synchronize the Output Selection byte to the actual Output Data, which is registered at a tri-state buffer shown in FIG. 28.

Figure 29:
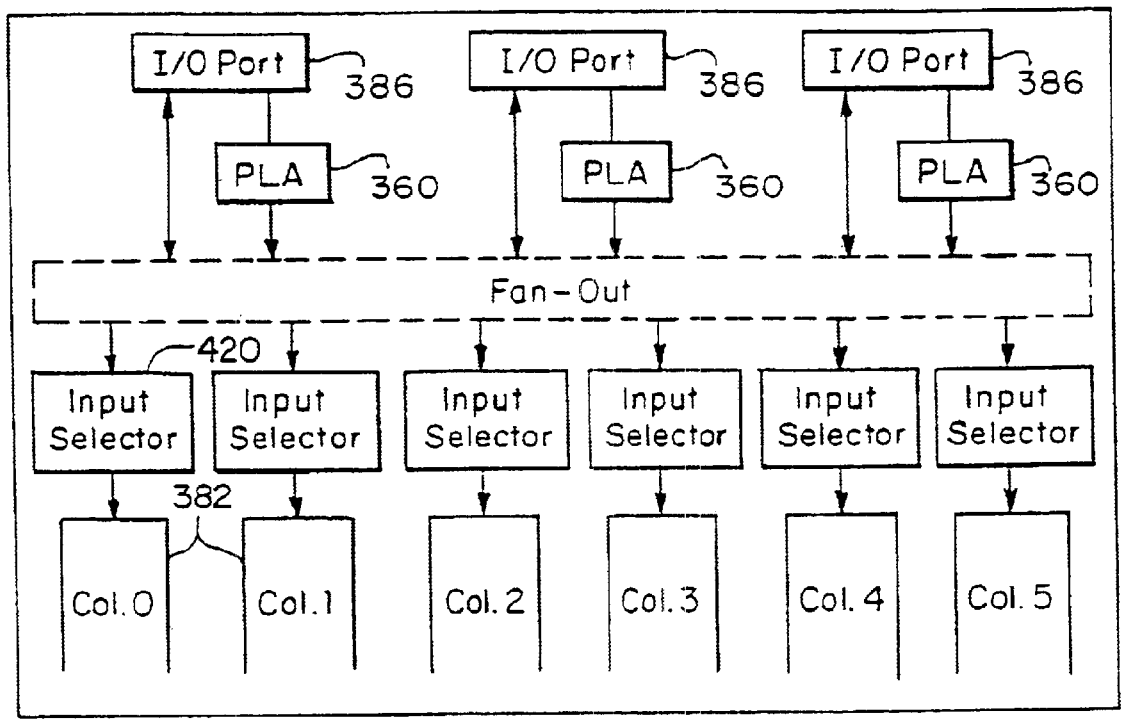
FIG. 29 is a block diagram illustrating how data enters the BFU core from off-chip.

FIG. 29 is a block diagram illustrating how data enters the BFU core from off-chip. At each BFU column 382, 4 values maybe inserted: L1_N1, L1$_{N2, L2}$_N1, and L2_N2, from the perspective of the top-most BFU in the column 382. From the point of view of a core BFU, these signals will appear to be coming from another BFU in the appropriate position, i.e., the perimeter position is transparent to the BFUs in the core. The diagonal connections assume this logical position, i.e., the NW input of a BFU is the same as the N1 input to its west neighbor. The only exception is the NE input on the east-most BFU. This position has its own switch. Note that the NW input to the west-most BFU will be handled by the west-side switching logic.

Each of these 4 values can select from 6 incoming data bytes: one from each of the I/O Ports 386 and one from each of the PLAs 360. This selection is made using the Input Selector switch 420.

Figure 30:
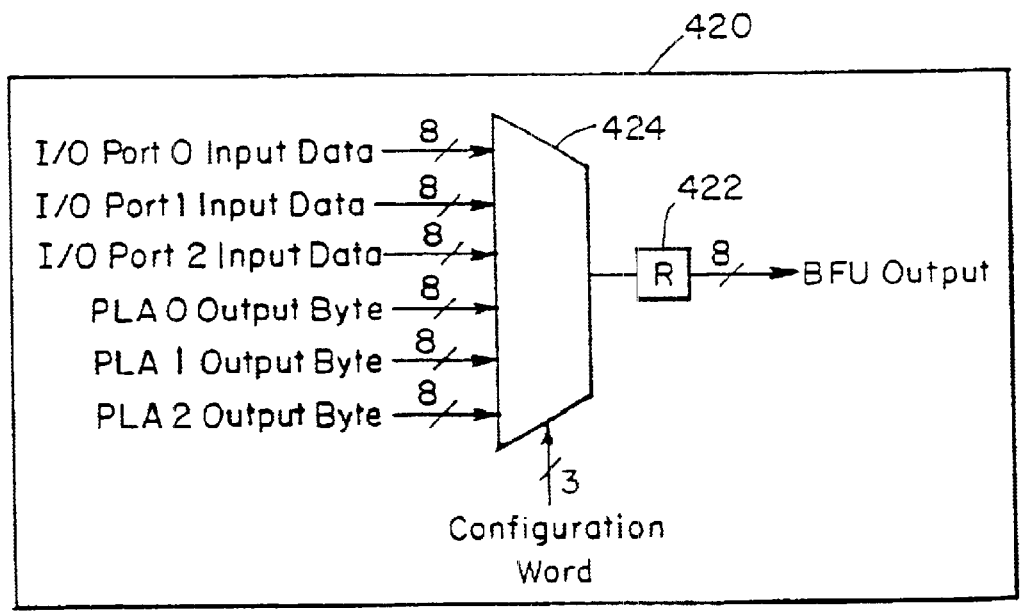
FIG. 30 is a block diagram showing the selector switch that selects among incoming data bytes from I/O ports and PLAs according to the invention.

FIG. 30 details the input selector 420. Note the pipeline register 422 on the output of the multiplexor 424 is controlled by the three bit configuration word.

Figure 31:
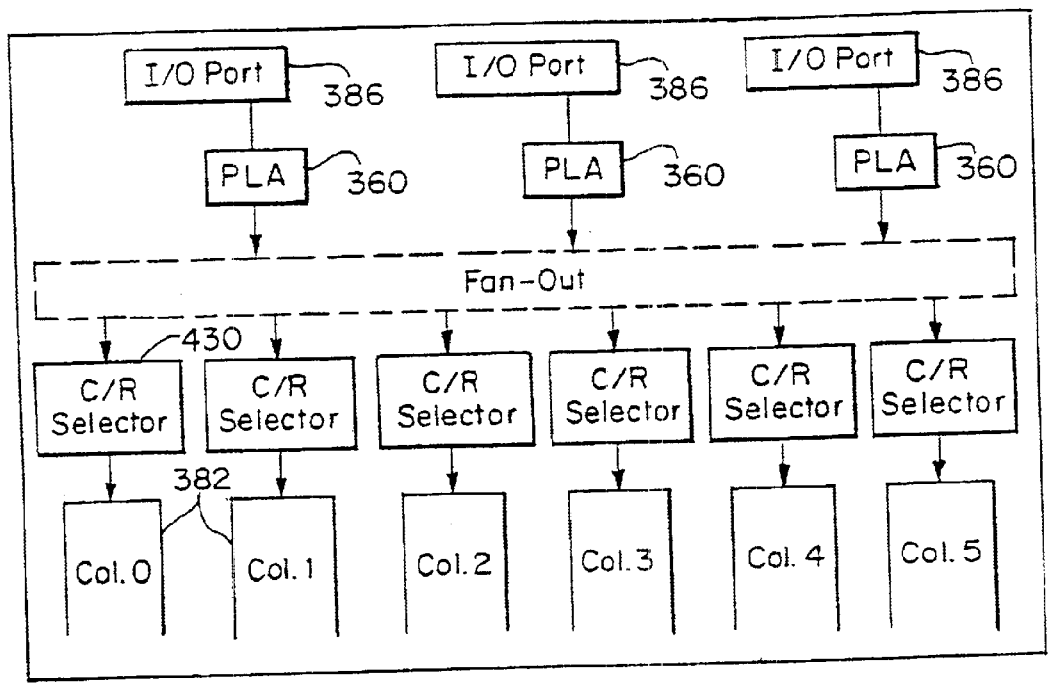
FIG. 31 is a block diagram of a C/R input architecture according to the invention.

FIG. 31 shows the architecture for switching the C/R inputs to core. One-bit versions 430 of the input selector switches 420, described previously, are used. The C/R selectors 430 can select from any of the 6 C/R inputs from the PLAs.

The Level-3 network lines are also controlled on the perimeter of the chip. The Level-3 Controllers select which BFU or I/O line drives the line on a given cycle (all 6 input/PLA lines, on both sides of the chip, can feed the Level-3 network). There is one controller per Level-3 line arranged so that there are two controllers at both ends of the rows/columns. On the North and East sides, controller 1 controls the V0 or H0 lines, while controller 2 controls the V1 and H1 lines. On the South and West sides, controller 1 controller V2 or H2, while controller 2 controls V3 or H3.

Figure 32:
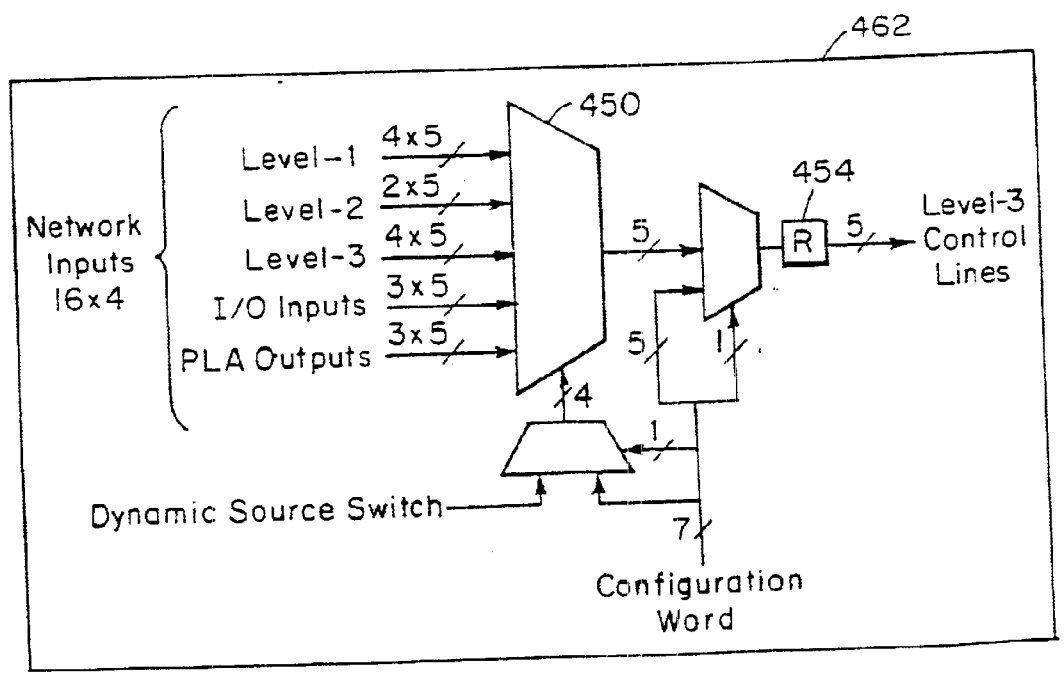
FIG. 32 is a block diagram showing the construction of the controller switches of the level-3 network lines according to the invention.

These controller switches are similar to the Address/Data and Network Switches in the BFU, in that they operate in constant value, static source, and dynamic source modes. FIG. 32 shows one of these switches 462.

The multiplexor 450 takes in all of the data outputs arriving at the edge of the that column: 2 Level-1, 2 Level-2 and Level-3 lines, the 6 input/PLA lines, as well as the diagonal connections from neighboring columns except at the corners where those lines do not exist. Multiplexor 452 determines whether the 5 bits of the configuration word sets the output through register 454.

Figure 33:
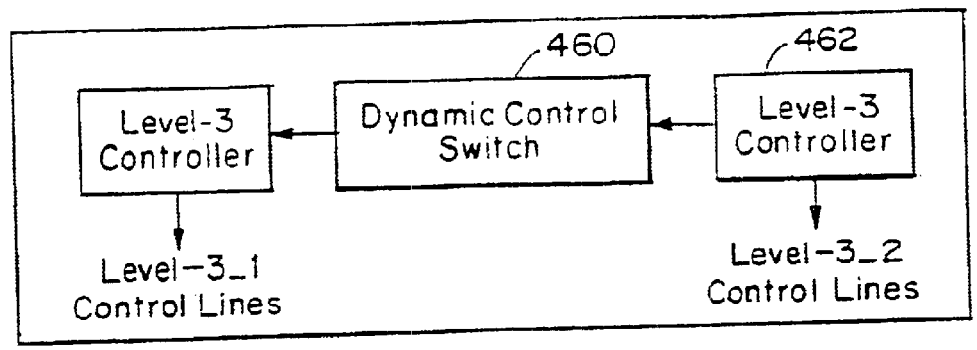
FIG. 33 is a block diagram illustrating the dynamic control of the controller switches, which is shared between pairs of controllers at each column, according to the invention.
Figure 34:
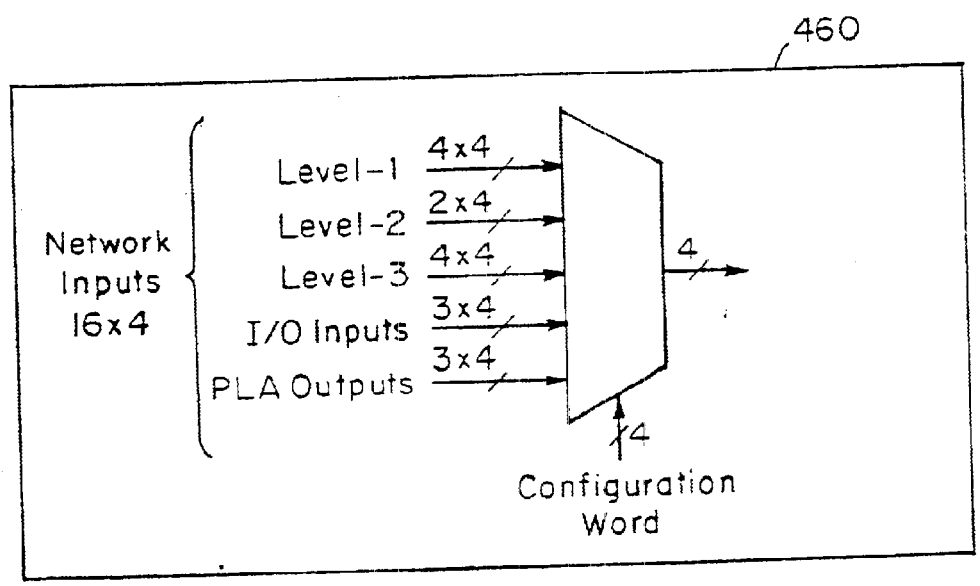
FIG. 34 shows the architecture of one of the dynamic control switches according to the invention.

The dynamic control for these switches comes from a switch that is shared between the pairs of controller at each end of the column. FIG. 33 shows the arrangement at one end of one column in which a dynamic control switch 460 controls adjacent three Level-3 controllers 462. The dynamic control switches are shown in FIG. 34. These switches are essentially static-source only versions of the Level-3 controller switches.

7. Usage

For illustrative purposes, various convolution implementations are shown on the device for a convolution task as follows: Given a set of k weights $\{w_1, w_2, \ldots, w_k\}$ and a sequence of samples $\{x_1, x_2, \ldots\}$, compute a sequence of results $\{y_1, y_2, \ldots\}$ according to:

$$y_i = w_1 \cdot x_i + w_2 \cdot x_{i+1} + \cdots + w_k \cdot x_{i+k-1}$$

a. Systolic

Figure 35:
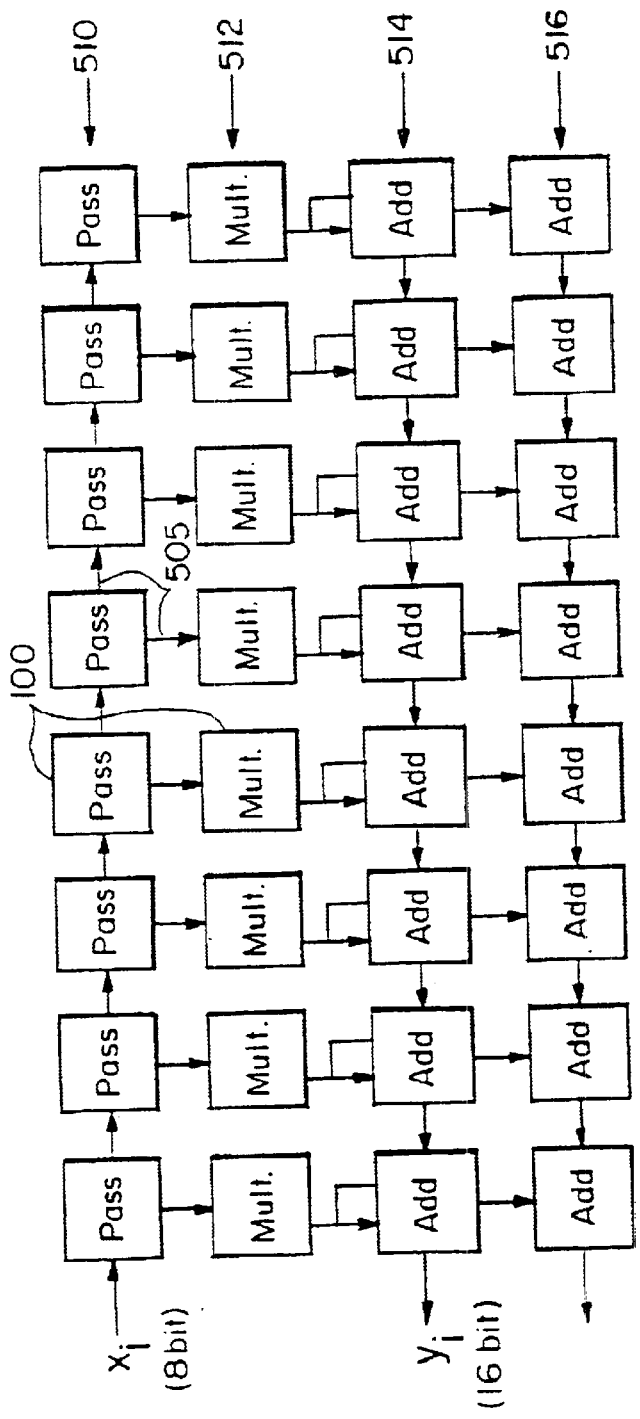
FIG. 35 is a block diagram showing the connectivity of BFUs in a systolic-type configuration according to the invention.

FIG. 35 shows an eight-weight (k=8) convolution of 8-bit samples accumulating a 16-bit result value. The top row simply carries sample values through the systolic pipeline. The middle row performs an 8×8 multiply against the constants weights, w's, producing a 16-bit result. The multiply operation is the rate limiter in this task requiring two cycles to produce each 16-bit result. The lower two rows accumulate $y_i$ results. In this case, all datapaths are wired using static source mode. The constant weights are configured as static value sources to the multiplier BFUs. ALU operations are set in static value mode. Add operations are configured for carry chaining to perform the required 16-bit add operation. For a k-weight filter, this arrangement requires 4k cells and produces one result every 2 cycles, completing, on average, $$\frac{k}{2} 8 \times 8 \text{ multiples}$$

and $$\frac{k}{2} \text{ 16-bit adds per cycle.}$$

In practice the horizontal level-two bypass lines can be used for pipelining the inputs, removing the need for the top row 510 of BFUs simply to carry sample values through the pipeline.

The horizontal and vertical level-two by-pass lines re-time the data flowing through the add pipeline so that only a single BFU adder is needed per filter tap stage.

Three instruction-stores and a program counter (PC) (not shown) control the operation of the multiply and add BFUs, as well as the advance of samples along the sample pipeline.

The k-weight filter can be implemented with only 2k+4 cells in practice.

b. Microcoded

Figure 36:
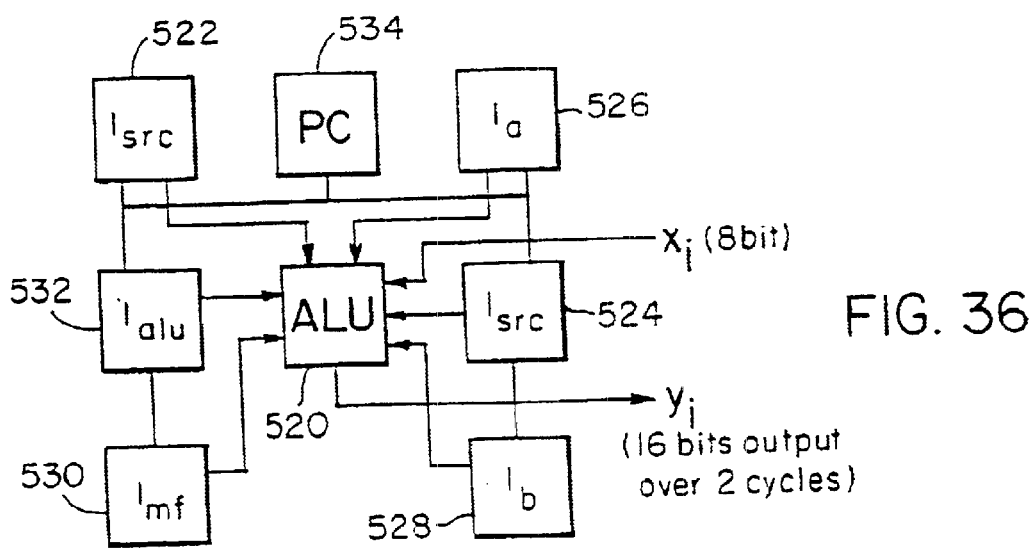
FIG. 36 shows the configuration of the BFUs for a microcoded-type implementation for the convolution problem according to the invention.

FIG. 36 shows a microcoded convolution implementation. The k coefficient weights are stored in the register-file memory of the BFU 100 configured to function as the ALU 520. Registers 1 through k hold the coefficient weights and the last k samples are stored in a ring buffer constructed from registers 65 through 64+k. Six other memory location (Rs, Rsp, Rw, Rwp, Rl, and Rh) are used to hold values during the computation. The A and B ports of ALU BFU 520 are set to dynamic source mode. The memory blocks of surrounding BFUs are assigned to feed data to ALU 520. BFUs 522,524 control the source of the A and B input to the ALU (two $I_{src}$ memories). The values fed into the A and B inputs of the ALU are provided by BFUs 526 and 528, respectively ($I_a,I_b$) BFUs 530 and 532 provide the memory function ($I_{mf}$) and the ALU function ($I_{alu}$). The program counter BFU PC 534 is a BFU setup to increment its output value or load an address from its associated memory.

The implementation requires 8 BFUs and produces a new 16-bit result every 8k+9 cycles. The result is output over two cycles on the ALU's output bus. The number of weights supported is limited to k≦61 by the space in the ALU's memory. Longer convolutions (larger k) can be supported by deploying additional memories to hold sample and coefficient values.

Custom VLIW (Horizontal Microcode)

Figure 37:
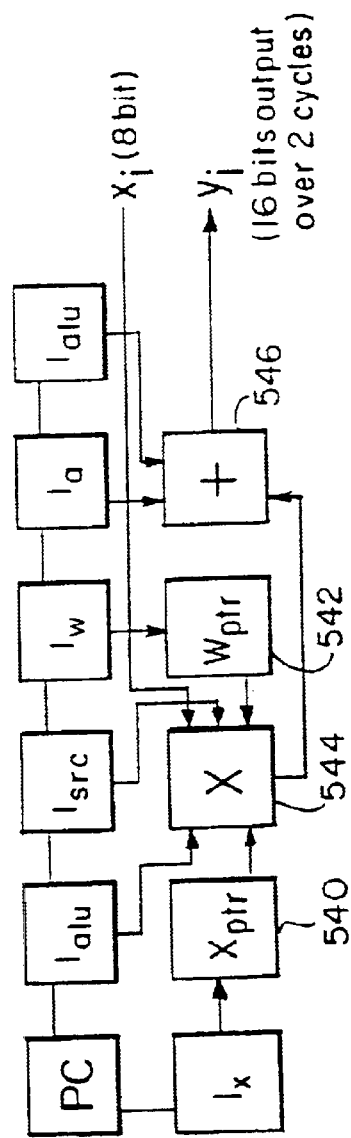
FIG. 37 shows the organization of the BFUs for a VLIW, horizontal microcode-type implementation according to the invention.

FIG. 37 shows a VLIW-style implementation of the convolution operation that includes application-specific dataflow. The sample pointer (Xptr) and the coefficient pointer (Wptr) are each assigned to BFUs 540, 542. Separate ALUs are used for the multiply operation and the summing or add operation BFU 546. This configuration allows the inner loop to consist of only two operations, the two-cycle multiply in parallel with the low and high byte additions. Pointer increments are also performed in parallel. Most of the I-stores used in this design only contain a couple of distinct instructions. With clever use of the control PLA and configuration words, the number of I-stores can be cut in half making this implementation no more costly than the microcoded implementation.

As shown, the implementation requires 11 BFUs and produces a new 16-bit result every 2k+1 cycles. As in the microcoded example the result is output over two cycles on the ALU output bus. The number of weights supported is limited to k≦64 by the space in the ALU's memory.

VLIW/SIMD

Figure 38:
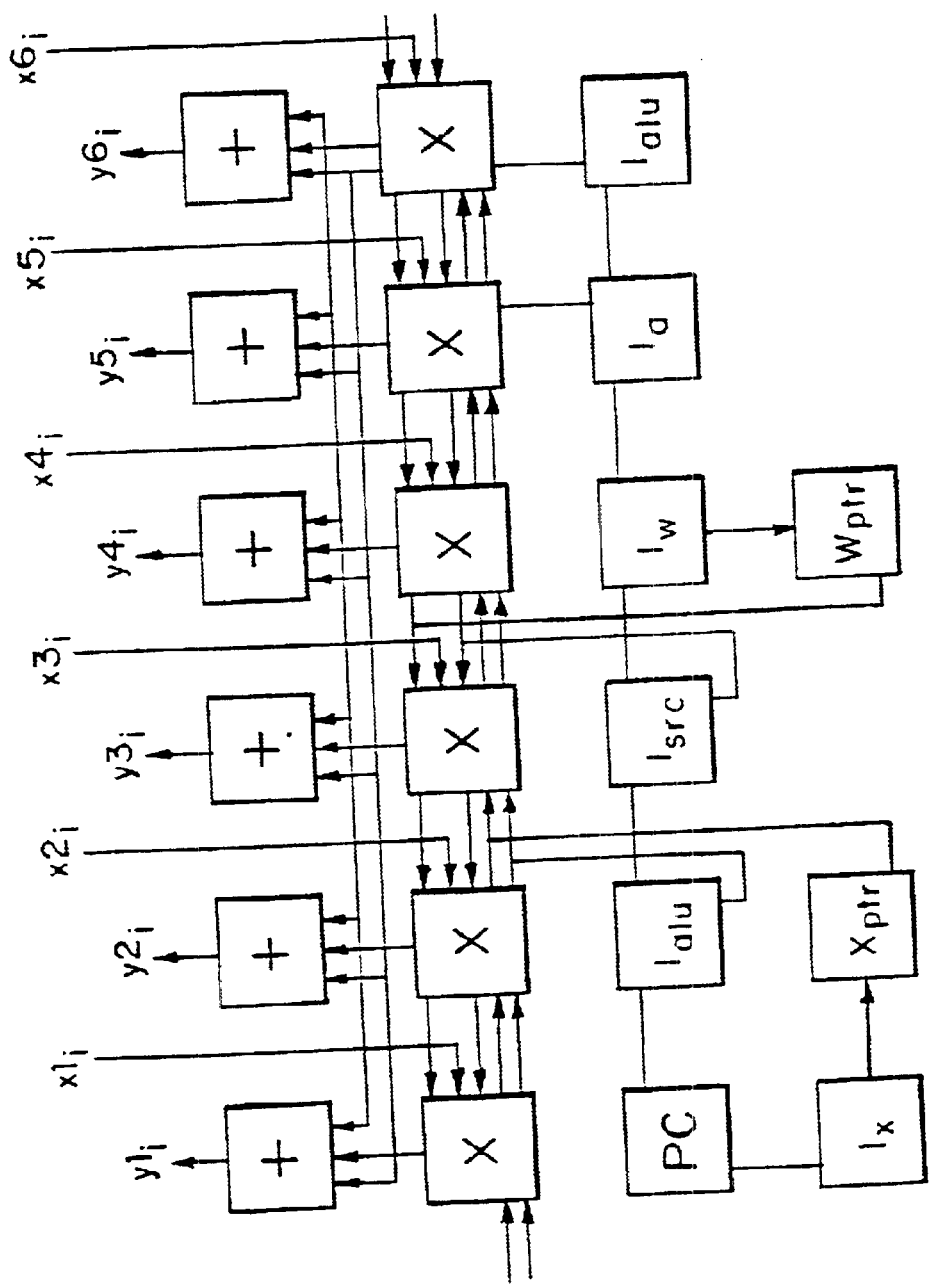
FIG. 38 shows the organization of the BFUs for a VLIW/MSIMD-type implementation according to the invention.

FIG. 38 shows a SIMD/VLIW hybrid implementation based on the control structure from the VLIW implementation. As shown in the figure, six separate convolutions are performed simultaneously sharing the same VLIW control developed to perform a single convolution, amortizing the cost of the control overhead. To exploit shared control in this manner, the sample data streams must receive data at the same rate in lock step.

BFU Details

A.1 Basic Configuration

A BFU's basic configuration consists of LSB (1 bit), MSB (1 bit), RightSource (3 bits), LeftSource (3 bits), CarryPipeline (1 bit), TSenable (1 bit), MAdd1source (1 bit), and MAdd2source (1 bit) bits. The following tables describe the bit-setting of this configuration in more detail:

| Configuration Word | Binary "0" Effect | Binary "1" Effect |
|---|---|---|
| LSB | BFU is not LSB | BFU is LSB |
| MSB | BFU is not MSB | BFU is MSB |
| CarryPipeline | Do not pipeline the Carry | Pipeline the Carry |
| TSenable | Time-Switching Disabled | Time-Switching Enabled |
| MAdd1source | X is hardwired | FP1 Selects X |
| MAdd2source | Y is hardwired | FP2 Selects Y |

| The values of Left and Right Source | | |
|---|---|---|
| Value | Source Selected | Description |
| 0 | North | North BFU |
| 1 | East | East BFU |
| 2 | South | South BFU |
| 3 | West | West BFU |
| 4 | Local | The Local BFU's carry |
| 5 | Control Bit | The local Control Bit |
| 6 | Zero | Constant Zero |
| 7 | One | Constant One |

A.2 ALU Port

The following shows the breakdown of the bits of the ALU Function Port:

Bit <7> Memory Write Enable (WE)–"1"=Write

Bit <6> Control Context Select (see Section 5.1)

Bit <5> Invert B input—"1"=Invert Shift Input Selection—"1"=B input Pass Source Selection—"1"=B input Bit <4> Invert A input—"1"=Invert Shift Direction—"1"=Left Pass Invert Selection—"1"=Invert Bits <3:0> ALU Operation. See Table below:

| Bits <3:0> | Operation |
|---|---|
| 0 | Multiply |
| 1 | Multiply-Add |
| 2 | Multiply-Add-Add |
| 3 | Multiply-Cont |
| 4 | Shift with Force Carry |
| 5 | Shift with Copy Bit |
| 6 | Shift with Insert 0 |
| 7 | Shift with Insert 1 |
| 8 | Add |
| 9 | Add-0 |
| 10 | Add-1 |
| 11 | (Add-1) |
| 12 | Pass |
| 13 | NAND |
| 14 | NOR |
| 15 | XOR |

Note that Opcode 11 is essentially unused, but if accidently issued will generate an Add-1 function.

For Shift and Pass operations, the Invert-A, and Invert-B controls have special functions:

For Shift, Invert-A is used to select the Shift Direction (Left or Right) and invert-B is used to select the Shift Source (A input or B input). In the current model, there is no way to perform an inversion during a shift operation.

For Pass, Invert-A is used to invert the Pass value and Invert-B is used to select the Pass Source (A or B input).

A.3 Memory/Multiplexor Controller Port

The following shows the breakdown of the bits of the Memory Function Port:

| Bit | Description | "0" Effect | "1" Effect |
|---|---|---|---|
| <7> | Mode | Single Port Memory | Dual Port Memory |
| <6> | ALU A Select | Input Port A | Memory Port A |
| <5> | ALU B Select | Input Port B | Memory Port B |
| <4> | Memory Data Select | Input Port B | Write-back |
| <3> | Configuration Memory WE | Don't Write | Write |
| <2> | Configuration Memory RE | Don't Read | Read |

Bits <1:0> are currently unused.

B Switch/Port Configuration Details
B.1 Switch Mode Selection

The configuration word used by the switch/ports is either a 9 or 10 bit value. The 9th bit determines whether or not the port has a constant value. The 10th bit, if it exists, determines whether the source selection (if used) is static or dynamic.

Therefore, in the 9 bit case (used by the Function and Floating Ports):

| Bits <9:8> | Port Mode |
|---|---|
| 00 | Static Value (Constant) |
| 01 | Dynamic Source |
| 10 | Static Value (Constant) |
| 11 | Static Source |

And in the 10 bit case (used by the Address/Data and Level-2 Network Ports):

| Bit 8 | Port Mode |
|---|---|
| 0 | Static Value (Constant) |
| 1 | Static Source |

B.2 Constant Value Selection

The constant value of a port is determines by the lower 8 bits of configuration (Bits <7:0>).

B.3 Source Selection

The source selection is performed by the lower 5 bits of configuration (or FPout value in the Dynamic Source case). The selection is the same for all ports:

| Bits <4:0> | Source | Description |
|---|---|---|
| 0 | Local | The local BFU |
| 1 | L1_N1 | Level-1 Network, From North-1 cell |
| 2 | L1_N2 | Level-1 Network, From North-2 cell |
| 3 | L1_NE | Level-1 Network, From NorthEast cell |
| 4 | L1_E1 | Level-1 Network, From East-1 cell |
| 5 | L1_E2 | Level-1 Network, From East-2 cell |
| 6 | L1_SE | Level-1 Network, From SouthEast cell |
| 7 | L1_S1 | Level-1 Network, From South-1 cell |
| 8 | L1_S2 | Level-1 Network, From South-2 cell |
| 9 | L1_SW | Level-1 Network, From SouthWest cell |
| 10 | L1_W1 | Level-1 Network, From West-1 cell |
| 11 | L1_W2 | Level-1 Network, From West-2 cell |
| 12 | L1_NW | Level-1 Network, From NorthWest cell |
| 13 | L2_N1 1 | Level-2 Network, North-1 Line |
| 14 | L2_N2 | Level-2 Network, North-2 Line |
| 15 | L2_E1 | Level-2 Network, East-1 Line |
| 16 | L2_E2 | Level-2 Network, East-2 Line |

-continued

| Bits <4:0> | Source | Description |
|---|---|---|
| 17 | L2_S1 | Level-2 Network, South-1 Line |
| 18 | L2_S2 | Level-2 Network, South-2 Line |
| 19 | L2_W1 | Level-2 Network, West-1 Line |
| 20 | L2_W2 | Level-2 Network, West-2 Line |
| 21 | L3_V1 | Level-3 Network, Vertical-1 Line |
| 22 | L3_V2 | Level-3 Network, Vertical-2 Line |
| 23 | L3_V3 | Level-3 Network, Vertical-3 Line |
| 24 | L3_V4 | Level-3 Network, Vertical-4 Line |
| 25 | L3_H1 | Level-3 Network, Horizontal-1 Line |
| 26 | L3_H2 | Level-3 Network, Horizontal-2 Line |
| 27 | L3_H3 | Level-3 Network, Horizontal-3 Line |
| 28 | L3_H4 | Level-3 Network, Horizontal-4 Line |
| 29 | CByte | Control Byte |
| 30 | C0 | Constant Value 0 (Binary: 00000000) |
| 31 | C1 | Constant Value 1 (Binary: 00000001) |

Notes:
On the Level-2 network, "1" and "2" lines are defined as the distances to the broadcasting L2 switch, divided by 2. Therefore the "1" line could either come from 1 or 2 cells away, and the "2" line could come from either 3 or 4 cells away.
In the Level-3 network, Vertical is defined as North-South and Horizontal is defined as East-West. Because they aplly uniformly to the entire chip, the numbering (from 1–4) is arbitrary, except that the Vertical-4 lines are the ones used for programming.

The constant values are a way of inserting constants into BFU, without changing the port configuration. In most cases these insert data values of zero and one. For the Fa (ALU) port, C0 is a plain A_Pass and C1 is a plain B_Pass. For the Fm (Memory) port, both C0 and C1 cause the BFU to ignore its memory and simply pass the inputs to the ALU. The only difference between them is the direction of the carry-in (C0 is from the north—vertical carry chain, C1 is from the east—horizontal carry chain). Thus the C0 and C1 port inputs effectively amount to no-operation instructions.

B.4 Driver Control
B.4.1 Level-1

The Level-1 driver control consists simply of 4 enables: North (including NW), East (including NE), South (including SE), and West (including SW). When these bit are set to "1", these drivers drive. When set to "0" the network lines are set to ground.

B.4.2 Level-2 and Level-3

Each Level-2 driver requires 4 bits of information:

| | Level-2 Driver Enable | | |
|---|---|---|---|
| Bit | Control | Effect when "0" | Effect when "1" |
| 1 | Register Enable | Pass Mode | Source Mode |
| 0 | Driver Enable | Set Line to "0" | Drive Data |

| Level-2 and Level-3 Driver Source Selection | |
|---|---|
| Value of Bit Pair | Switch Select |
| 0 | Network Switch 1 (N1) |
| 1 | Network Switch 2 (N2) |
| 2 | Floating Port 1 (FP1) |
| 3 | Floating Port 2 (FP2) |

The Level-3 drivers require only the two bits of switch select information. The Register Enable is unused (always enabled) and the driver enables come from the perimeter logic (See Section 6).

The switch selectors on the Level-2 and Level-3 drivers use a two-context configuration, similar to the network switches. The driver enables are single context. There are 2 Level-2 and 8 Level-3 drivers in every BFU.

C Control Configuration Details

C.1 Compare/Reduce Logic

The reduction logic configuration is the word that will be compared to the Comp/Reduce block's input. In this word, each bit-position can take four states: Zero, One, Don't Care, or Fail. A 0 succeeds in the Zero state, while a 1 succeeds in the One state. When an incoming bit is compared to a Don't Care, it always succeeds. Conversely, when the bit is compared to a Fail it always fails. Thus, each bit-position of the comparison word must be represented by 2 bits. The first (low) bit is the output of the bit-position if the input is a 0, the second is the output if the input is 1. This is outlined in the following table:

| Bit-Position Code | Meaning    | Output on 0 | Output on 1 |
|-------------------|------------|-------------|-------------|
| 00                | Fail       | 0           | 0           |
| 01                | Zero       | 1           | 0           |
| 10                | One        | 0           | 1           |
| 11                | Don't Care | 1           | 1           |

Based on this, the two Comp/Reduce Block configurations are 18 bits for C/R I and 42 bits for C/R II. The bit-positions for C/R I match the bit-positions of the BFU output, where the carry is the high 9th bit. Note that there are actually two 18 bit words associated with C/R I—one for each of the control contexts (see FIG. 10). The breakdown for the C/R II inputs are as follows:

| Bit-Position | Bit Source                        |
|--------------|-----------------------------------|
| 0            | The local BFU C/R                 |
| 1            | Level-1 Network, From North-1 cell |
| 2            | C/R from North-2 cell             |
| 3            | C/R from NorthEast cell           |
| 4            | C/R from East-1 cell              |
| 5            | C/R from East-2 cell              |
| 6            | C/R from SouthEast cell           |
| 7            | C/R from South-1 cell             |
| 8            | C/R from South-2 cell             |
| 9            | C/R from SouthWest cell           |
| 10           | C/R from West-1 cell              |
| 11           | C/R from West-2 cell              |
| 12           | C/R from NorthWest cell           |
| 13           | Floating Port Bit 0               |
| 14           | Floating Port Bit 1               |
| 15           | Floating Port Bit 2               |
| 16           | Floating Port Bit 3               |
| 17           | Floating Port Bit 4               |
| 18           | Floating Port Bit 5               |
| 19           | Floating Port Bit 6               |
| 20           | Floating Port Bit 7               |

C.2 OR Plane

The OR plane has 20 inputs and 9 outputs. Each of the 20 inputs is inverted and both polarities are used in the array. Each output therefore requires 40 bits of configuration. Each bit of these words selects one input (in positive or inverted form) to be in the OR operation. Each of these 40-bit words is arranged as follows:

| Bits  | Input Controlled      |
|-------|-----------------------|
| 0,1   | Floating Port I Bit 0 |
| 2,3   | Floating Port I Bit 1 |
| 4,5   | Floating Port I Bit 2 |
| 6,7   | Floating Port I Bit 3 |
| 8,9   | Floating Port I Bit 4 |
| 10,11 | Floating Port I Bit 5 |
| 12,13 | Floating Port I Bit 6 |
| 14,15 | Floating Port I Bit 7 |
| 16,17 | Floating Port II Bit 0 |
| 18,19 | Floating Port II Bit 1 |
| 20,21 | Floating Port II Bit 2 |
| 22,23 | Floating Port II Bit 3 |
| 24,25 | Floating Port II Bit 4 |
| 26,27 | Floating Port II Bit 5 |
| 28,29 | Floating Port II Bit 6 |
| 30,31 | Floating Port II Bit 7 |
| 32,33 | Comp/Reduce Input 1   |
| 34,35 | Comp/Reduce Input 2   |
| 36,37 | Comp/Reduce Input 3   |
| 38,39 | Comp/Reduce Input 4   |

The first (lower) of each of these pairs of bits controls the positive input, while the second controls the inverted input.

C.3 Comp/Reduce Select-4

The configuration for the selection of Compare/Reduce inputs to the OR Plane consists of 4 4-bit numbers. Each number selects one of the 4 inputs. The C/R line selected is given on the following table:

| Selection Value | C/R Source                         |
|-----------------|------------------------------------|
| 0               | The local BFU C/R                  |
| 1               | Level-1 Network, From North-1 cell |
| 2               | C/R from North-2 cell              |
| 3               | C/R from NorthEast cell            |
| 4               | C/R from East-1 cell               |
| 5               | C/R from East-2 cell               |
| 6               | C/R from SouthEast cell            |
| 7               | C/R from South-1 cell              |
| 8               | C/R from South-2 cell              |
| 9               | C/R from SouthWest cell            |
| 10              | C/R from West-1 cell               |
| 11              | C/R from West-2 cell               |
| 12              | C/R from NorthWest cell            |
| 13              | Constant Value "0"                 |
| 14              | Constant Value "0"                 |
| 15              | Constant Value "0"                 |

C.4 Multiplexor Selection

There are two multiplexors in the control logic, labeled as follows:

| CR2_InSel   | Comp/Reduce II Input Select |
|-------------|------------------------------|
| CtrlBit_Sel | Control Bit Select           |

Each of these selects consists of one bit and have the following effects:

| Select      | "0"             | "1"              |
|-------------|-----------------|------------------|
| CR2_InSel   | Floating Port I | Floating Port II |
| CtrlBit_Sel | Comp/Reduce     | OR Plane         |

D Perimeter Details

D.1 I/O Register

Each I/O register has a single configuration bit which defines which edge of the Pad CLK (Sync CLK) the register uses to latch its data.

| Bit | Edge Used |
| --- | --- |
| 0 | Positive Edge |
| 1 | Negative Edge |

D.2 Port PLAs

D.2.1 AND Plane

The AND plane of a Port PLA has 38 inputs and 45 outputs (product terms). Each of the 38 inputs is inverted and both polarities are available in the array. Therefore each output of the AND plane is specified by 76 bits of data. The bit pairs are arranged as follows:

| Bit Pairs | Inputs |
| --- | --- |
| 0–7 | State Bits <0:7> |
| 8–15 | PLA in Data <0:7> |
| 16–23 | I/O Input Data <0:7> |
| 24–25 | Column 0: C/R Out <CR_S2:CR_S1> |
| 26–27 | Column 1: C/R Out <CR_S2:CR_S1> |
| 28–29 | Column 2: C/R Out <CR_S2:CR_S1> |
| 30–31 | Column 3: C/R Out <CR_S2:CR_S1> |
| 32–33 | Column 4: C/R Out <CR_S2:CR_S1> |
| 34–35 | Column 5: C/R Out <CR_S2:CR_S1> |
| 36 | I/O Input Bit 0 |
| 37 | I/O Input Bit 1 |

Each bit represents an input bit, and its inverse, in that order.

D.2.2 OR Plan

The OR plane of a Port PLA has 45 inputs (the product terms), and 15 outputs. Unlike for the AND plane, the inputs are not inverted, so that each of the 15 outputs is specified by 45 bits, one for each product term. The outputs are in the following order:

| Output # | Output |
| --- | --- |
| 0–7 | PLA OutData <0:7> |
| 8–9 | C/R In <0:1> |
| 10–11 | I/O Output Bits <0:1> |
| 12 | Data Output Enable |
| 13 | Bit 0 Output Enable |
| 14 | Bit 1 Output Enable |

D.3 Output Selection

D.3.1 Data Selection

Each of the 3 I/O Port Outputs has 51 possible drivers. The 3 PLA Inputs each have 48 possible drivers (they don't get the PLA outputs). A 6-bit output control bus selects one of these, according to the following tables:

| Selector Groups | |
| --- | --- |
| Selector Value, Bits <5:3> | Column Selected |
| 0 | BFU Column 0 |
| 1 | BFU Column 1 |
| 2 | BFU Column 2 |
| 3 | BFU Column 3 |
| 4 | BFU Column 4 |
| 5 | BFU Column 5 |
| 6 | PLA I/O Ports and Constant "1" |
| 7 | Constant "0" |

| Groups 0–5 | |
| --- | --- |
| Selector Value, Bits <2:0> | Source Selected |
| 0 | L1_S1 |
| 1 | L1_S2 |
| 2 | L2_S1 |
| 3 | L2_S2 |
| 4 | L3_V1 |
| 5 | L3_V2 |
| 6 | L3_V3 |
| 7 | L3_V4 |

Note:
The S1 and S2 designations refers to what those signals would be if seen by an extra BFU at the end of the column.

| Group 6 | | |
| --- | --- | --- |
| Selector Value, Bits <2:0> | I/O Port Source | PLA Input Source |
| 0 | PLA 0 Output | Constant "1" |
| 1 | PLA 1 Output | Constant "1" |
| 2 | PLA 2 Output | Constant "1" |
| 3 | Constant "1" | Constant "1" |
| 4 | Constant "1" | Constant "1" |
| 5 | Constant "1" | Constant "1" |
| 6 | Constant "1" | Constant "1" |
| 7 | Constant "1" | Constant "1" |

D.3.2 Selector Switch

The switch that determines this output selection is a Constant Value/Static Source switch. It takes a 7-bit configuration word, where the 7th bit switches between Constant Value ("0") and Static Source "1". The remaining 6 bits either provide the selection word directly, or choose one of the following static sources:

| Configuration Bits <4:0> | Source |
| --- | --- |
| 0 | Column 2 L1_S1 |
| 1 | Column 2 L1_S2 |
| 2 | Column 2 L2_S1 |
| 3 | Column 2 L2_S2 |
| 4 | Column 2 L3_V1 |
| 5 | Column 2 L3_V2 |
| 6 | Column 2 L3_V3 |

-continued

| Configuration Bits <4:0> | Source |
|---|---|
| 7 | Column 2 L3_V4 |
| 8 | Column 3 L1_S1 |
| 9 | Column 3 L2_S2 |
| 10 | Column 3 L2_S1 |
| 11 | Column 3 L2_S2 |
| 12 | Column 3 L3_V1 |
| 13 | Column 3 L3_V2 |
| 14 | Column 3 L3_V3 |
| 15 | Column 3 L3_V4 |
| 16 | I/O Port 0 Input Data |
| 17 | I/O Port 1 Input Data |
| 18 | I/O Port 2 Input Data |
| 19 | PLA 0 Output Data |
| 20 | PLA 1 Output Data |
| 21 | PLA 2 Output Data |
| 22–23 | Constant "1" |
| 24–31 | Constant "0" |

D.4 Input Selection

Each of the BFU column input switches takes in 6 possible values. This is controlled by a static 3-bit configuration word. The following table describes the selection:

| Configuration Word | Source |
|---|---|
| 0 | I/O Port 0 Input Data |
| 1 | I/O Port 1 Input Data |
| 2 | I/O Port 2 Input Data |
| 3 | PLA 0 Output Data |
| 4 | PLA 1 Output Data |
| 5 | PLA 2 Output Data |
| 6 | Constant "1" |
| 7 | Constant "0" |

The C/R Inputs are also selected using a 3-bit configuration word:

| Configuration Word | Source |
|---|---|
| 0 | PLA 0 C/R In 0 |
| 1 | PLA 0 C/R In 1 |
| 2 | PLA 1 C/R In 0 |
| 3 | PLA 1 C/R In 1 |
| 4 | PLA 2 C/R In 0 |
| 5 | PLA 2 C/R In 1 |
| 6 | Constant "1" |
| 7 | Constant "0" |

D.5 Level-3 Network Controllers

D.5.1 Data Selection

The output of each Level-3 Network controller determines which Level-3 driver drives that particular line. The selection is performed by a 5-bit selector:

| Selection Word | Source Selected |
|---|---|
| 0 | BFU 0 |
| 1 | BFU 1 |
| 2 | BFU 2 |
| 3 | BFU 3 |
| 4 | BFU 4 |
| 5 | BFU 5 |
| 6 | Constant "0" |
| 7 | Constant "1" |
| 8 | Same Side I/O Port 0 Input Data |
| 9 | Same Side I/O Port 1 Input Data |
| 10 | Same Side I/O Port 2 Input Data |
| 11 | Same Side PLA 0 Output Data |
| 12 | Same Side PLA 1 Output Data |
| 13 | Same Side PLA 2 Output Data |
| 14 | Constant "0" |
| 15 | Constant "1" |
| 16 | Opposite Side I/O Port 0 Input Data |
| 17 | Opposite Side I/O Port 1 Input Data |
| 18 | Opposite Side I/O Port 2 Input Data |
| 19 | Opposite Side PLA 0 Output Data |
| 20 | Opposite Side PLA 1 Output Data |
| 21 | Opposite Side PLA 2 Output Data |
| 22 | Constant "0" |
| 23 | Constant "1" |
| 24–31 | Constant "0" |

D.5.2 Controller Switch Selection

The Level-3 Controller Switch used to select the source is a Constant Value, Static Source, or Dynamic Source Switch. Its takes a 7-bit configuration word, where the top two bits control the switch mode. See the table in Appendix B.1. The remaining 5 bits serve as the constant value, or select the static source as follows:

| Configuration Bits<3:0> | Source Selected |
|---|---|
| 0 | L1_SE |
| 1 | L1_S1 |
| 2 | L1_S2 |
| 3 | L1_SW |
| 4 | L2_S1 |
| 5 | L2_S2 |
| | L3_V1 |
| | L3_V2 |
| | L3_V3 |
| | L3_V4 |
| | I/O Port 0 Input Data |
| | I/O Port 1 Input Data |
| | I/O Port 2 Input Data |
| | PLA 0 Output Byte |
| | PLA 0 Output Byte |
| | PLA 0 Output Byte |

D.5.3 Dynamic Switch Selection

The Dynamic Control Switch for the Level-3 Controllers is a fully static source version of the Level-3 Controller described above. It takes a 4 bit configuration word and uses that as the static source selector in the manner described by the table above.

| Core Configuration (Bit<14>=0) | | |
|---|---|---|
| <13:11> Row Address | <10:8> Column Address | <7:0> Core Configuration |

| Perimeter Configuration (Bit<14>=1) | |
|---|---|
| <13:12> Side Selection | <11:0> Side Configuration |

E. Configuration Details

This section will detail the address space of the configuration memories of a the chip. The address space is 15 bits wide (the 16th programming address bit selects between the configuration and main BFU memories). Of these 15 bits the high bit selects between the Core ("0") and the Perimeter ("1"). The breakdown of the remaining 14 bits is shown in FIG. 27.

Row Address and Column Address are the position of the BFU where BFU(0,0) is at the SW corner of the chip.

The Side Selection (Perimeter Address) is performed as follows:

| Address | Side |
| --- | --- |
| 0 | North |
| 1 | East |
| 2 | South |
| 3 | West |

The BFU and Side configurations are described below.

E.1 BFU Configuration Space

There are two parts to a BFU's configuration: the main BFU configuration and the OR plane configuration. They are separated because while the main BFU configuration has two global contexts (see Section ??), the OR plane does not.

The BFU Configuration Address is an 8-bit word. The 8th bit selects between Context 2 ("0") and Context 3 ("1"). As mentioned above, this does not apply to the OR plane—it is addressed on both settings. The 7th bit selects between the main BFU configuration ("0") and the OR plane configuration ("1"). The remaining 6 bits are described below.

E.1.1 Main BFU Configuration

E.1.1 Main BFU Configuration

| Byte | Name | Data |
| --- | --- | --- |
| 0 | BFUcore_0 | <MSB, LSB, RightSource, LeftSource> |
| 1 | BFUcore_1 | <4 bits unused, MAdd2source, MAdd1source, TS_Enable, CarryPipeline> |
| 2 | Fa_Port_a | Low 8 bits of ctx a (Data Bits) |
| 3 | Fa_Port_b | Low 8 bits of ctx b (Data Bits) |
| 4 | Fm_Port_a | Low 8 bits of ctx a (Data Bits) |
| 5 | Fm_Port_b | Low 8 bits of ctx b (Data Bits) |
| 6 | F_Port_SD | <4 bits unused,Fm_b,Fm_a,Fa_b,Fa_a> |
| 7 | A_Port_a | Low 8 bits of ctx a (Data Bits) |
| 8 | A_Port_b | Low 8 bits of ctx b (Data Bits) |
| 9 | B_Port_a | Low 8 bits of ctx a (Data Bits) |
| 10 | B_Port_b | Low 8 bits of ctx b (Data Bits) |
| 11 | Add_Port_SD | <B_b, B_a, A_b, A_a> |
| 12 | N1_Port_a | Low 8 bits of ctx a (Data Bits) |
| 13 | N1_Port_b | Low 8 bits of ctx b (Data Bits) |
| 14 | N2_Port_a | Low 8 bits of ctx a (Data Bits) |
| 15 | N2_Port_b | Low 8 bits of ctx b (Data Bits) |
| 16 | Net_Port_SD | <N2_b, N2_a, N1_b, N1_a> |
| 17 | FP1_Port_a | Low 8 bits of ctx a (Data Bits) |
| 18 | FP1_Port_b | Low 8 bits of ctx b (Data Bits) |
| 19 | FP2_Port_a | Low 8 bits of ctx a (Data Bits) |
| 20 | FP2_Port_b | Low 8 bits of ctx b (Data Bits) |
| 21 | FP_Port_SD | <4 bits unused, FP2_b,FP2_a,FP1_b,FP1_a> |

Note:
The "SD" in entries such as F_Port_SD refers to the Static/Dynamic selection bits for that particular port.

| Byte | Name | Data |
| --- | --- | --- |
| 22 | L1drive | <4 bits unused, L1_N, L1_E, L1_S, L2_W> |
| 23 | L2select | <4 bits unused, L2_2 select, L2_1 select (2 bits each)> |
| 24 | L2drive | <4 bits unused, L2_2 config, L2_1 config (2 bits each)> |
| 25 | L3select_V | <L3_V4, L3_V3, L3_V2, L3_V1 (2 bits each)> |
| 26 | L3select_H | <L3_H4, L3_H3, L3_H2, L3_H1 (2 bits each)> |
| 27 | TS_add | <B_Port TSconfig, A_Port TSconfig - 4 bits each> |
| 28 | TS_func | <Fm_Port TSconfig, Fa_Port TSconfig - 4 bits each> |
| 29 | TS_ctrlFP | <Ctrl_FP2 TSconfig, Ctrl_FP1 TSconfig - 4 bits each> |
| 30 | TS_WE/CR | <WE TSconfig, Ctrl_C/R TSconfig - 4 bits each> |
| 31 | TS_MAdd | <MAdd2 TSconfig, MAdd1 TSconfig - 4 bits each> |
| 32 | C/R_I_1a | Low 8 bits of Comp/Reduce I (Bit Positions [3:0]) - Context A |
| 33 | C/R_I_2a | Middle 8 bits of Comp/Reduce I (Bit Positions [7:4]) - Context A |
| 34 | C/R_I_1b | Low 8 bits of Comp/Reduce I (Bit Positions [3:0]) - Context B |
| 35 | C/R_I_2b | Middle 8 bits of Comp/Reduce I (Bit Positions [7:4]) - Context B |
| 36 | C/R_I_3 | <4 bits unused, High 2 bits of C/R I (Bit Position 8) - Contexts B,A> |
| 37 | C/R_II_1 | Low 8 bits of Comp/Reduce II (Bit Positions [3:0]) |
| 38 | C/R_II_2 | Middle 8 bits of Comp/Reduce II (Bit Positions [7:4]) |
| 39 | C/R_II_3 | Middle 8 bits of Comp/Reduce II (Bit Positions [11:8]) |
| 40 | C/R_II_4 | Middle 8 bits of Comp/Reduce II (Bit Positions [15:12]) |
| 41 | C/R_II_5 | High 8 bits of Comp/Reduce II (Bit Positions [19:16]) |
| 42 | C/R_II_6 | <6 bits unused, High 2 bits of C/R II (Bit Position 20)> |
| 43 | C/R_Sel_1 | <Select C/R-2 (4 bits), Select C/R-1 (4 bits)> |
| 44 | C/R_Sel_2 | <Select C/R-4 (4 bits), Select C/R-3 (4 bits)> |
| 45 | Ctrl_Sel | <6 bits unused, CR2_InSel, CtrlBit_Sel> |
| 46–53 | Unused | Unused - no effect |

L2_1 is the driver for either the North or East Level-2 line, and L2_2 is the driver for either South or West Level-2 line, depending on the BFU position.

E.1.2 OR Plane Configuration

The OR Plane is configured by a bit stream which is simply the concatenation of the bit vectors for each output. Section C describes these bit vectors. The bit stream is broken into 8-bit chunks, and addresses in sequence. Because each output vector is 40 bits long, this divides evenly.

The whole stream consists the OR0 output through the OR8 output, where OR07 are the Control Byte outputs and OR8 is the Control Bit output. There are a total of 45 full bytes in the stream (5 for each output).

E.2 Side Configuration Space

The Side Configuration Address is 12 bits long. With this much space, it is possible to sparsely encode the data for easy decoding. Any addresses not mentioned here are unused.

The high bit (<11>) is used to select between the PLA's ("1") and the rest of the perimeter logic ("0").

E.2.1 PLA Configuration

The PLA configuration is broken down as follows:

| Address <10:9> | PLA # |
|---|---|
| 0 | 0 |
| 1 | 1 |
| 2 | 2 |
| 3 | N/A |

| Address <8> | Plane |
|---|---|
| 0 | AND |
| 1 | OR |

Like the BFU OR Planes, the AND and OR planes of the perimeter PLAs are specified by bit streams, which are concatenation of the bit vectors for each output.

The AND plane has 45 outputs (product terms), each of which is specified by a 76-bit long vector. Each vector is broken into 10 bytes, where the final byte has 4 unused bits. The vectors are arranged in order, so that Pterm0 is first and Pterm44 is last.

The OR plane has 15 outputs, each of which is specified by a 45-bit vector. Each vector is broken into 6 bytes, where the final byte has 3 unused bits.

Note that the PLAs have single context memories.

E.2.2 Non-PLA Perimeter Configuration

The remaining perimeter logic is split up as follows:

| Address <10:8> | Memory |
|---|---|
| 0 | I/O Registers |
| 1 | Output Switches |
| 2 | Input Switches |
| 3 | Input C/R Logic |
| 4 | Level-3 Control Logic |
| 5–7 | Unused |

All this logic, except the I/O Registers, have two contexts. These contexts are selected via Bit<7>, where 0=Context 2 and 1=Context 3.

1. I/O Registers

There are only three bytes of data associated with the I/O Registers, on for each port (0,1 and 2, addressed accordingly). The bits are arranged as follows:

| Bit | Register Controlled |
|---|---|
| 0 | I/O Output Data |
| 1 | I/O Input Data |
| 2 | I/O Bit0 Output |
| 3 | I/O Bit0 Input |
| 4 | I/O Bit1 Output |
| 5 | I/O Bit1 Input |
| 6 | Unused |
| 7 | Unused |

2. Output Switches

Each output switch is controlled by a 7-bit word. These words are treated as bytes with the high bit ignored, and addressed as follows:

| Address <2:0> | Output Switch |
|---|---|
| 0 | I/O Port 0 |
| 1 | I/O Port 1 |
| 2 | I/O Port 2 |
| 3 | PLA 0 Input |
| 4 | PLA 1 Input |
| 5 | PLA 2 Input |
| 6 | Unused |
| 7 | Unused |

3. Input Switches

Each input switch is controlled by a 3-bit word. These words are treated as bytes with the high 5 bits ignored. Bits <5:3> of the address are treated as a row or column address (depending on the side). Bits <2:0> address the specific switches:

| Address <2:0> | Switch Selected |
|---|---|
| 0 | L1_N1 |
| 1 | L1_N2 |
| 2 | L2_N1 |
| 3 | L2_N2 |
| 4 | L1_NE (Column 5 only) |
| 5 | Unused |
| 6 | Unused |
| 7 | Unused |

Note:
The switches listed here are for the North side of the chip. Other sides are symmetric. The lines are labeled at the north-most BFU of the column sees them.

4. C/R Input Switches

Each C/R input switch is also controlled by a 3-bit word. Like the Inputs Switches, above, these words are treated as bytes with the high 5 bits ignored. Bits <5:3> of the address are treated as a row or column address (depending on the side). Bits <2:0> address the specific switches as shown in the table above.

5. Level-3 Controllers

The Level-3 controller switches are each controlled by a 7-bit word. The Level-3 dynamic controller switches are each controlled by a 4-bit word. These words are each treated as bytes with the high bit (or 4 bits) ignored. Bits <5:3> of the address are treated as a row or column address (depending on the side). Bits <1:0> address the specific switches:

| Address <1:0> | Switch Selected |
|---|---|
| 0 | Level-3 Dynamic Controller |
| 1 | Level-3 Controller 1 |
| 2 | Level-3 Controller 2 |
| 3 | Unused |

Note that Bit<2> isn't used for the Level-3 controllers so that the row/column address is in the same position as the input switches.

While this invention has been particularly shown and described with references to preferred embodiments thereof, it will be understood by those skilled in the art that various changes in form and detail may be made therein without departing from the spirit and scope of the invention as defined by the appended claims. For Example, while the ALU 120 and memory block 110 are described as being associated with each other in the BFU, they could be distributed from each other with the interconnect handling all memory-to-ALU communication. Also, in some implementations, the described processing device could be associated with memory or a larger conventional microprocessor as an accelerator, for example.

We claim:

1. A programmable integrated circuit comprising:
   a plurality of like functional units arranged to perform operations on data in response to instructions and to store configuration data, each functional unit including a first memory and an arithmetic and logic unit;
   a plurality of second memories outside the functional units and in the integrated circuit;
   a configurable first bus coupled to the functional units and arranged in a first configuration to transmit control commands from the functional units and arranged in a second configuration to transmit data from the functional units; and
   a plurality of second busses coupled to the functional units and arranged to transmit data from the functional units to the second memories.

2. An integrated circuit as claimed in claim 1 wherein the second memories comprise registers.

3. An integrated circuit as claimed in claim 1 wherein the first bus is configured by changes to bits in the functional units.

4. In a programmable integrated circuit comprising a plurality of like functional units coupled by an interconnect, the functional units including memory and arithmetic and logic units, a method of processing data in the functional units and transmitting the data comprising:
   storing data in the functional units;
   performing arithmetic and logic operations in the functional units in response to instructions and in response to data stored in the functional units;
   storing configuration data in the functional units;
   storing data outside the functional units in the integrated circuit via transmission of the data from the functional units on the interconnect;
   configuring the interconnect in a first configuration to transmit control commands from the functional units; and
   configuring the interconnect in a second configuration to transmit data from the functional unbits.

5. A method as claimed in claim 4 wherein the integrated circuit comprises registers outside the functional units and in the integrated circuit, and wherein storing data outside the functional units in the integrated circuit comprises storing data in the registers.

6. A method as claimed in claim 4 wherein configuring the interconnect in a first configuration and configuring the interconnect in a second configuration comprises changing to bits in the functional units.

* * * * *